United States Patent
Kumar et al.

(10) Patent No.: US 11,941,391 B2
(45) Date of Patent: Mar. 26, 2024

(54) MICROCODE(UCODE) HOT-UPGRADE METHOD FOR BARE METAL CLOUD DEPLOYMENT

(71) Applicant: Intel Corporation, Santa Clara, CA (US)

(72) Inventors: Mohan J. Kumar, Aloha, OR (US); Sarathy Jayakumar, Portland, OR (US); Chuan Song, Shanghai (CN); Ruixia Li, Shanghai (CN); Xiaojin Yuan, Shanghai (CN); Haiyue Wang, Shanghai (CN); Chong Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 16/841,410

(22) Filed: Apr. 6, 2020

(65) Prior Publication Data
US 2020/0285461 A1    Sep. 10, 2020

(51) Int. Cl.
*G06F 8/656* (2018.01)
*G06F 8/654* (2018.01)
(Continued)

(52) U.S. Cl.
CPC ............ *G06F 8/656* (2018.02); *G06F 8/654* (2018.02); *G06F 9/4401* (2013.01); *G06F 9/44557* (2013.01); *G06F 9/45541* (2013.01)

(58) Field of Classification Search
CPC .. G06F 8/60–66; G06F 9/4401; G06F 9/4406; G06F 9/4408; G06F 9/441; G06F 9/4416; G06F 9/44557
(Continued)

(56) References Cited

U.S. PATENT DOCUMENTS

2006/0143209 A1*  6/2006  Zimmer ................. G06F 8/656
2010/0115202 A1   5/2010  Zimmer et al.
(Continued)

FOREIGN PATENT DOCUMENTS

KR    20110060791 A    6/2011

OTHER PUBLICATIONS

Bare-metal server, Wikipedia, 2019, 2 pages, [retrieved on Nov. 20, 2023], Retrieved from the Internet: <URL:https://web.archive.org/web/20191112130245/https://en.wikipedia.org/wiki/Bare-metal_server>.*

(Continued)

*Primary Examiner* — Geoffrey R St Leger
(74) *Attorney, Agent, or Firm* — Compass IP Law PC

(57) ABSTRACT

A microcode (uCode) hot-upgrade method for bare metal cloud deployment and associated apparatus. The uCode hot-upgrade method applies a uCode patch to a firmware storage device (e.g., BIOS SPI flash) through an out-of-band controller (e.g., baseboard management controller (BMC)). In conjunction with receiving a uCode patch, a uCode upgrade interrupt service is triggered to upgrade uCode for one or more CPUs in a bare-metal cloud platform during runtime of a tenant host operating system (OS) using an out-of-bound process. This innovation enables cloud service providers to deploy uCode hot-patches to bare metal servers for persistent storage and live-patch without touching the tenant operating system environment.

17 Claims, 18 Drawing Sheets

(51) Int. Cl.
  *G06F 9/4401* (2018.01)
  *G06F 9/445* (2018.01)
  *G06F 9/455* (2018.01)

(58) Field of Classification Search
  USPC .................................................. 717/168–178
  See application file for complete search history.

(56) References Cited

U.S. PATENT DOCUMENTS

| | | | |
|---|---|---|---|
| 2012/0110562 A1* | 5/2012 | Heinrich | G06F 8/65 |
| | | | 717/169 |
| 2012/0233628 A1 | 9/2012 | Ling et al. | |
| 2015/0020062 A1 | 1/2015 | Kuzmack et al. | |
| 2016/0019053 A1 | 1/2016 | Gambardella et al. | |
| 2020/0218527 A1* | 7/2020 | Ganesan | G06F 8/65 |
| 2020/0285461 A1 | 9/2020 | Kumar et al. | |
| 2021/0240468 A1* | 8/2021 | Shanmugam | G06F 8/658 |

OTHER PUBLICATIONS

Microcode, Wikipedia, 2019, 13 pages, [retrieved on Nov. 20, 2023], Retrieved from the Internet: <URL:https://web.archive.org/web/20190921181407/https://en.wikipedia.org/wiki/Microcode>.*
International Search Report and Written Opinion for PCT Patent Application No. PCT/US20/61317, dated Mar. 5, 2021, 11 pages.

* cited by examiner

MICROCODE(UCODE) HOT-UPGRADE METHOD FOR BARE METAL CLOUD DEPLOYMENT

BACKGROUND INFORMATION

The use of cloud-hosted services and applications has exploded in the past decade and continues to grow at an exponential rate. Cloud-hosted services and applications are generally implemented in large data centers housing thousands of compute platforms such as servers, blade servers, server modules, micro-servers, etc. Oftentimes, the platforms are configured as virtualized execution used for hosting virtual machines and "containers" or the like in which software applications are run.

Each platform includes physical hardware, firmware (also referred to as BIOS—Basic Input-Output System), and software. The root of trust for the platform is the platform hardware and firmware, which although less susceptible to malicious actors that software still may pose a risk. For security and other reasons (e.g., performance), platform firmware may need to be updated.

Historically, the BIOS in personal computer (PC) platforms was a monolithic block of code that was installed in Read-Only Memory (ROM), wherein BIOS was updated by replacing the BIOS ROM chip. Subsequently, the BIOS was installed in EEPROM (Electrically Erasable Programmable Read-Only Memory) and could be replaced (in its entirely) via a firmware update. In approximately 1998, Intel® Corporation began development of a modular firmware architecture known as the Extensible Firmware Interface (EFI). In 2005, the Unified EFI forum was formed as an industry-wide organization to promote adoption and continue the development of the EFI Specification. Using the EFI 1.10 Specification as the starting point, this industry group released began releasing firmware specifications, renamed Unified EFI (UEFI). UEFI firmware dominates today's platform architectures. UEFI firmware has a modular architecture that includes a core block to which modules are added, wherein the core block is booted first and the booted code is used to load the modules during platform boot. Also, rather than EEPROMs, most of today's firmware is stored in flash memory (sometimes referred to as BIOS flash and referred to as persistent flash memory). More generally, platform firmware may be stored in a non-volatile storage device, which includes but is not limited to flash memory and EEPROMs.

Under some platform architectures, bootloaders may be used to load platform firmware. For example, bootloaders are used for mobile devices and some server platforms.

Traditionally, the uCode updates can be loaded into CPU (central processing unit, aka processor) either by boot time loading (if the uCode update corresponds to pre-boot uCode that is loaded prior to booting an operating system) or by operating system execution time loading (referred to as a hot-upgrade or run-time uCode update). Cloud environments are sensitive to system downtime caused by system firmware upgrades and the cloud service providers prefer the hot-upgrade method to load uCode patch through operating system utility in runtime if the uCode update does not have dependencies to the boot phase of platform hardware and operating system.

Cloud service providers provide a variety options for tenants, including virtualized environments under which the service provider provides and operating system and hypervisor or VMM (virtual machine monitor) on which tenant-managed virtual machines (VMs) are run and "bare" metal platforms under which the cloud service provider leases the hardware on which tenant VMs are run without a host operating system provided by the service provider. An example of a bare metal cloud environment 100 is shown in FIG. 1, which includes a cloud service provider environment 102 and a tenant environment 104. Cloud service provider environment 102 includes a managed platform 106 including one or more host CPUs 108 and BIOS SPI (Serial Peripheral Interface) flash 110. Cloud service provider environment 102 also includes BIOS firmware (FW) 112.

Tenant environment 104 includes a host operating system 114 on which one or more applications 116 are run. For illustrative purposes, tenant environment is further depicted as including a uCode hot-upgrade utility 118 that would be used to support uCode hot-upgrades during operating runtime for a virtual environment that wasn't bare metal. Under bare metal environment 100, host operating system 114 is owned by a single tenant instead of the cloud service provider. This makes it much more complex for cloud service providers to facilitate uCode updates using hot-upgrade methods for tenant-owned operating system environments, such as illustrated for tenant environment 104. In particular, uCode hot-upgrade utility 118 cannot update uCode using an in-band method in bare metal cloud environment 100.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 3a-3e illustrate states of the BIOS flash layout corresponding to different timeframes in connection with handling multiple uCode patches, wherein FIG. 3a illustrates the state of the BIOS flash layout at a first timeframe, FIG. 3b illustrates the state of the BIOS flash layout at a second timeframe, FIG. 3c illustrates the state of the BIOS flash layout at a third timeframe, FIG. 3d illustrates the state of the BIOS flash layout at a fourth timeframe, and FIG. 3e illustrates the state of the BIOS flash layout at a fifth timeframe;

DETAILED DESCRIPTION

Figure 1:
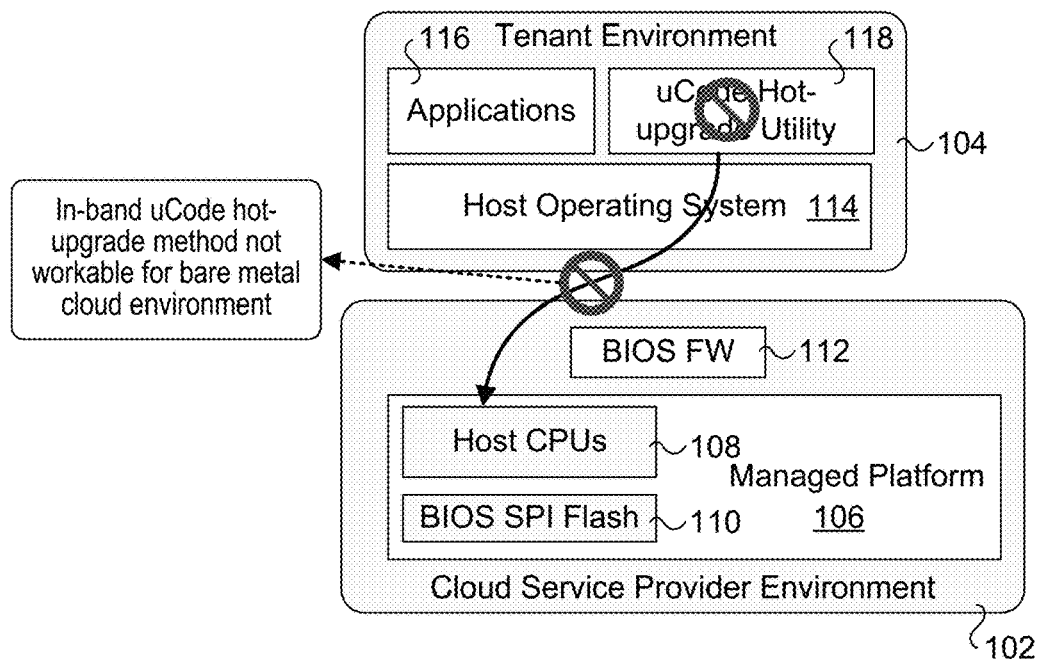
FIG. 1 is a schematic diagram illustrating a cloud service provider environment employing a bare metal cloud environment include a managed bare metal platform hosting a tenant environment, and further illustrating that an in-band uCode hot-upgrade method is not workable for such an environment.

Embodiments of a microcode (uCode) hot-upgrade method for bare metal cloud deployment and associated apparatus configured to implement the method are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a uCode hot-upgrade method is provided that applies the uCode patch to a firmware storage device such as BIOS SPI flash through an out-of-band controller, such as but not limited to a baseboard management controller (BMC). In one aspect, this innovation defines an interrupt service, such as a SMI (System Management Interrupt) service, to upgrade uCode patch to one or more CPUs in the bare-metal managed platform in runtime. The BMC uses an out-of-band channel (e.g. asserting an interrupt such as a SMI GPIO (general purpose Input-Output), or virtual wire message over Enhanced Serial Peripheral Interface Bus (eSPI)) to notify a host CPU to execute a uCode update service for the uCode hot-upgrade.

This innovation enables cloud service providers to deploy uCode hot-patches to bare metal servers for persistent storage and live-patch without touching the tenant operating system environment. This approach significantly reduces the complexity and cost for cloud customers to deploy uCode patch in bare metal environment. The method is transparent for host operating system and the tenant's applications (meaning performed independent of the host OS) and helps cloud service providers to improve user experiences for tenants while deploying firmware patches for host bare metal systems without explicit interruption to tenant's applications.

Figure 2:
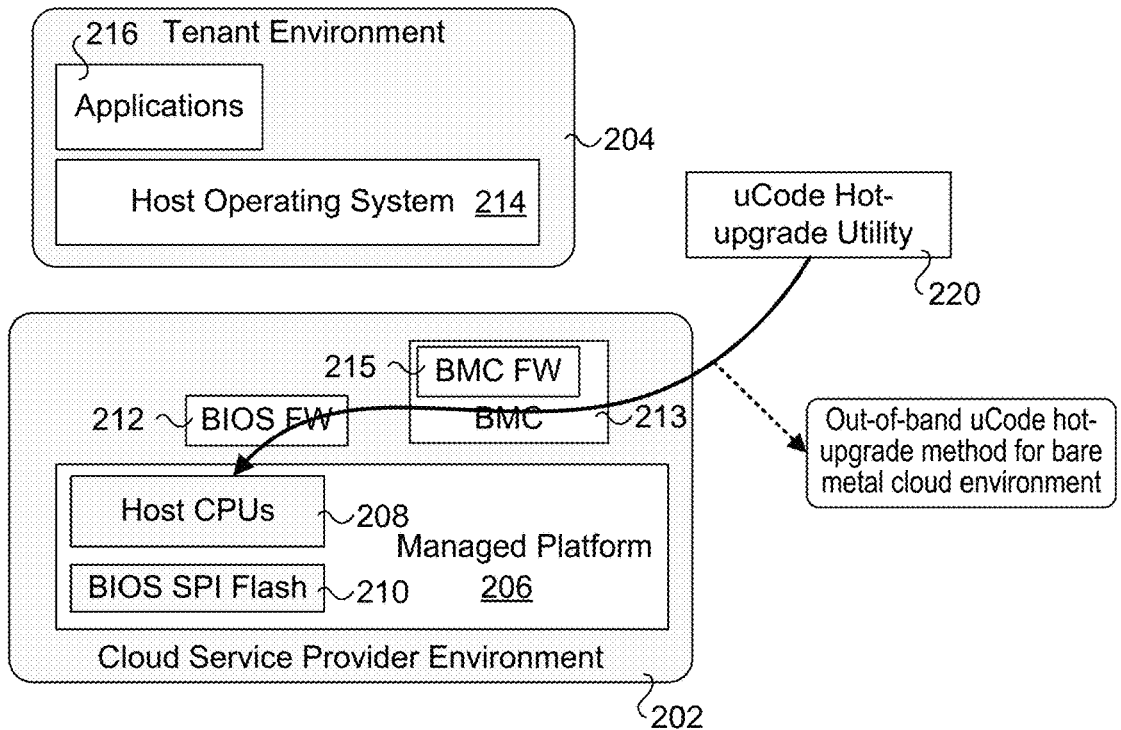
FIG. 2 is a schematic diagram illustrating an out-of-band uCode hot-upgrade method implemented for a bare metal cloud environment, according to one embodiment.

An overview of the method deployed for a bare metal cloud environment 200 is shown in FIG. 2. Bare metal cloud environment 200 includes a cloud service provider environment 202 and a tenant environment 204. Cloud service provider environment 202 includes a managed platform 206 including one or more host CPUs 208 and BIOS SPI flash 210. Cloud service provider environment 102 also includes BIOS firmware 112 and a baseboard management controller (BMC) 213 including BMC firmware 215. Tenant environment 204 includes a host operating system 214 on which one or more applications 216 are run. In some deployments, applications 216 may include a Type-2 Hypervisor or VMM hosting one or more VMs, with a respective operating system running on each VM.

As further shown in FIG. 2, a uCode hot-upgrade utility 220 is used to perform an out-of-band uCode hot-upgrade through use of BMC 213. As described and illustrated in further detail below, the BMC firmware will kick off an SMI service on a host CPU 208, which will temporarily pause operation of applications running on managed platform 206 (including host OS 214 and application 216 in tenant environment 204 to enable the uCode patch to be installed in BIOS SPI flash 210. After the uCode patch has been installed, the SMI service will complete, and the system will return to run-time operations using the upgraded uCode in one of more host CPUs 208.

Figure 3:
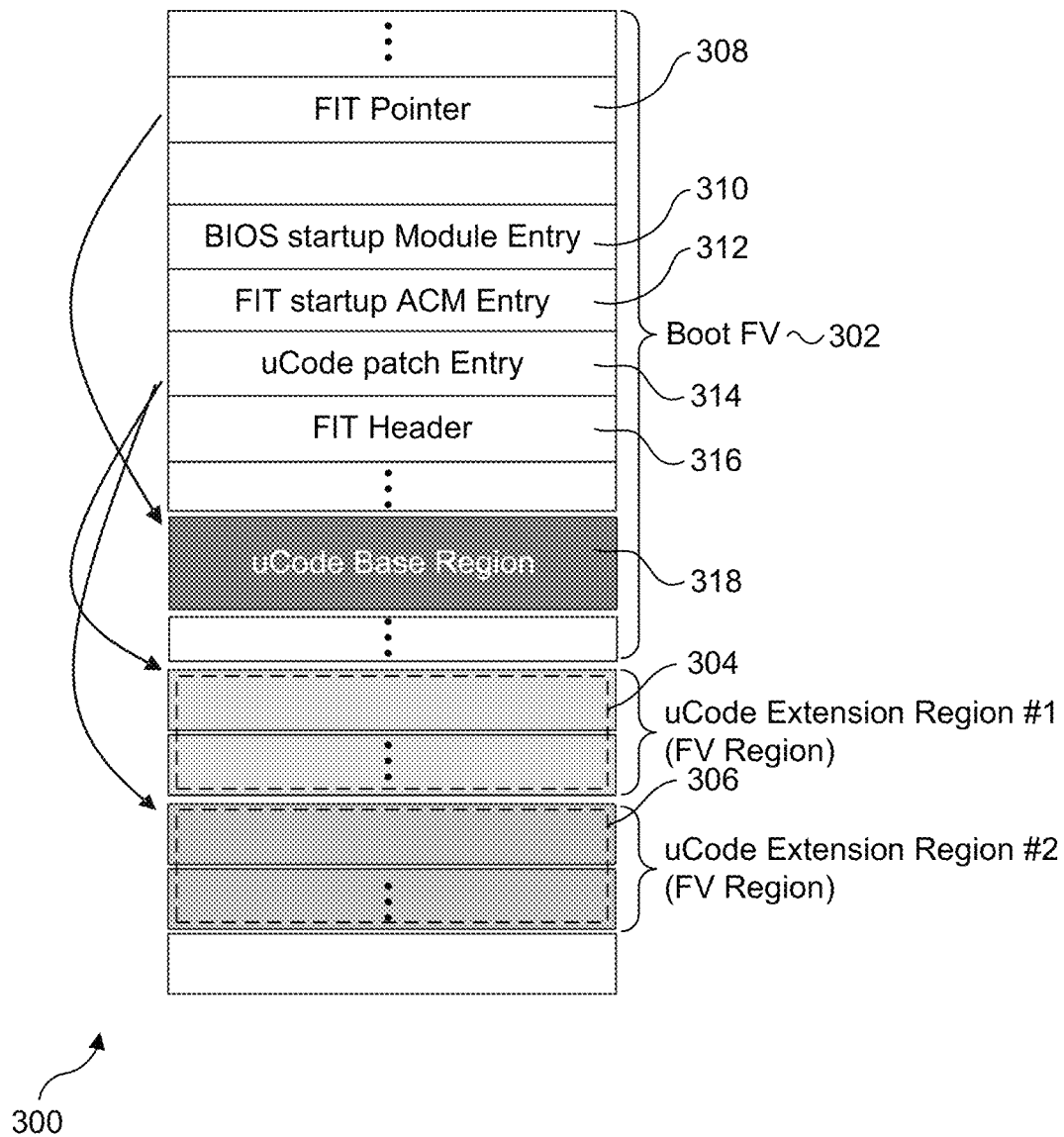
FIG. 3 is a diagram illustrating the structure of a BIOS flash layout, according to one embodiment.

FIG. 3 shows a diagram 300 illustrating the structure of a BIOS SPI flash layout, according to one embodiment. In one implementation, the BIOS region mapped to an address of 4 G minus 16 MB is divided into three FVs (firmware volumes), as depicted by a Boot FV 302, a uCode Extension FV 304 that may be stored in one or more slots in a uCode FV extension region #1) and a uCode Extension FV 306 that may be stored in one or more slots in a uCode FV extension region #2. Boot FV 302 contains a reset vector to (the starting address for) Firmware Interface Table (FIT) pointers 308, a BIOS startup module entry 310, a FIT startup ACM entry 314, a uCode path Entry 314, a FIT header 316, and a uCode base image 318 (that corresponds to the latest bootable uCode image). In BIOS FV 302, FIT pointer 308 is fixed and is not permitted to be changed via a runtime update. uCode extension region #1 and uCode extension region #2 are uCode extension regions used to store the runtime uCode patches (also referred to as FVs or uCode images).

FIT pointer 308 comprises an entry table with pointers (entry points) to various regions in the BIOS flash layout. In one embodiment, the location and size of uCode regions in BIOS flash are fixed, and thus the entry table for FIT pointer 308 will not be updated while updating contents of uCode regions.

In one embodiment, if uCode extension regions #1 and #2 are empty, the starting address for uCode extension region #1 is located at 0xFFFF_FFFF. In one embodiment, all uCode extension regions (e.g., uCode extension regions #1 and #2 in the embodiments illustrated herein) support modular update by the host operating system at runtime and the boot firmware service at boot time. During a subsequent boot, if the uCode update entries are valid, they will be utilized to load the uCode with a higher version number, as described and illustrated below.

Figure 4:
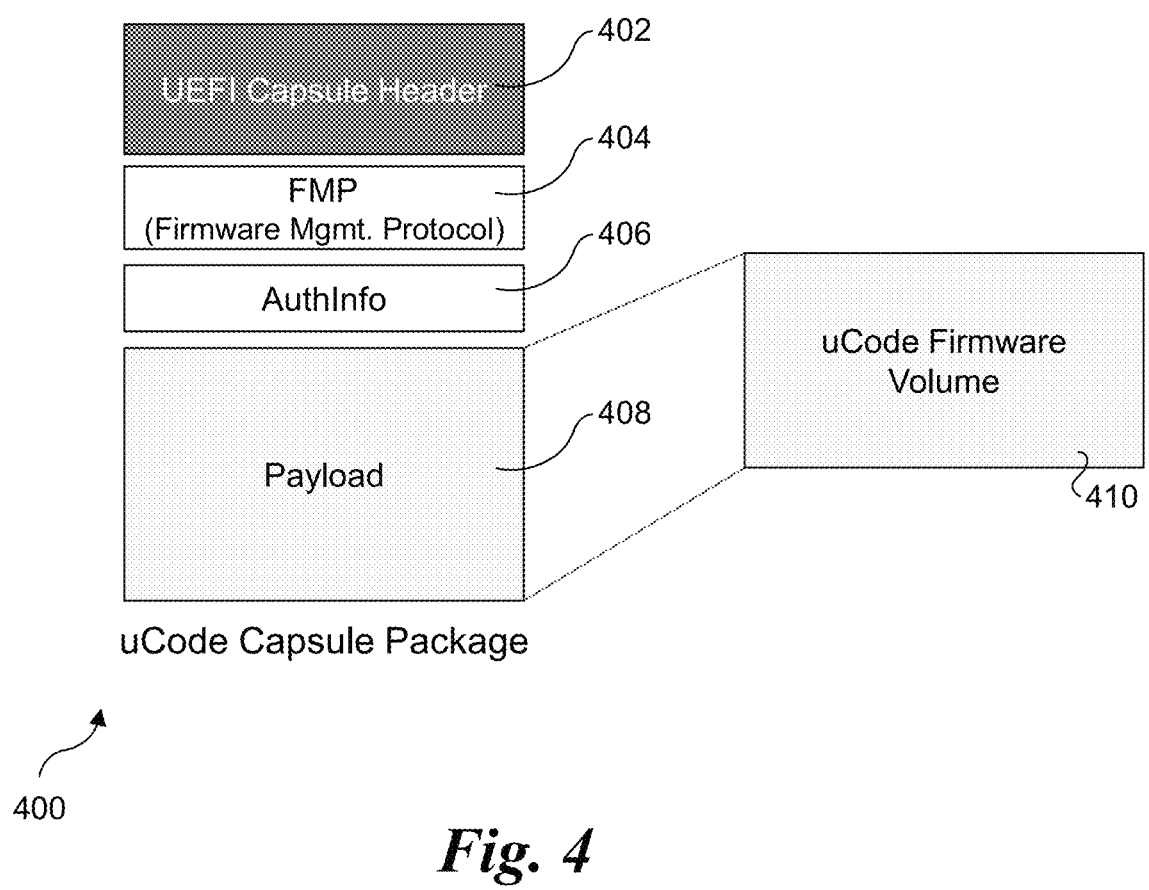
FIG. 4 is a diagram of a uCode capsule package, according to one embodiment.
Figure 5:
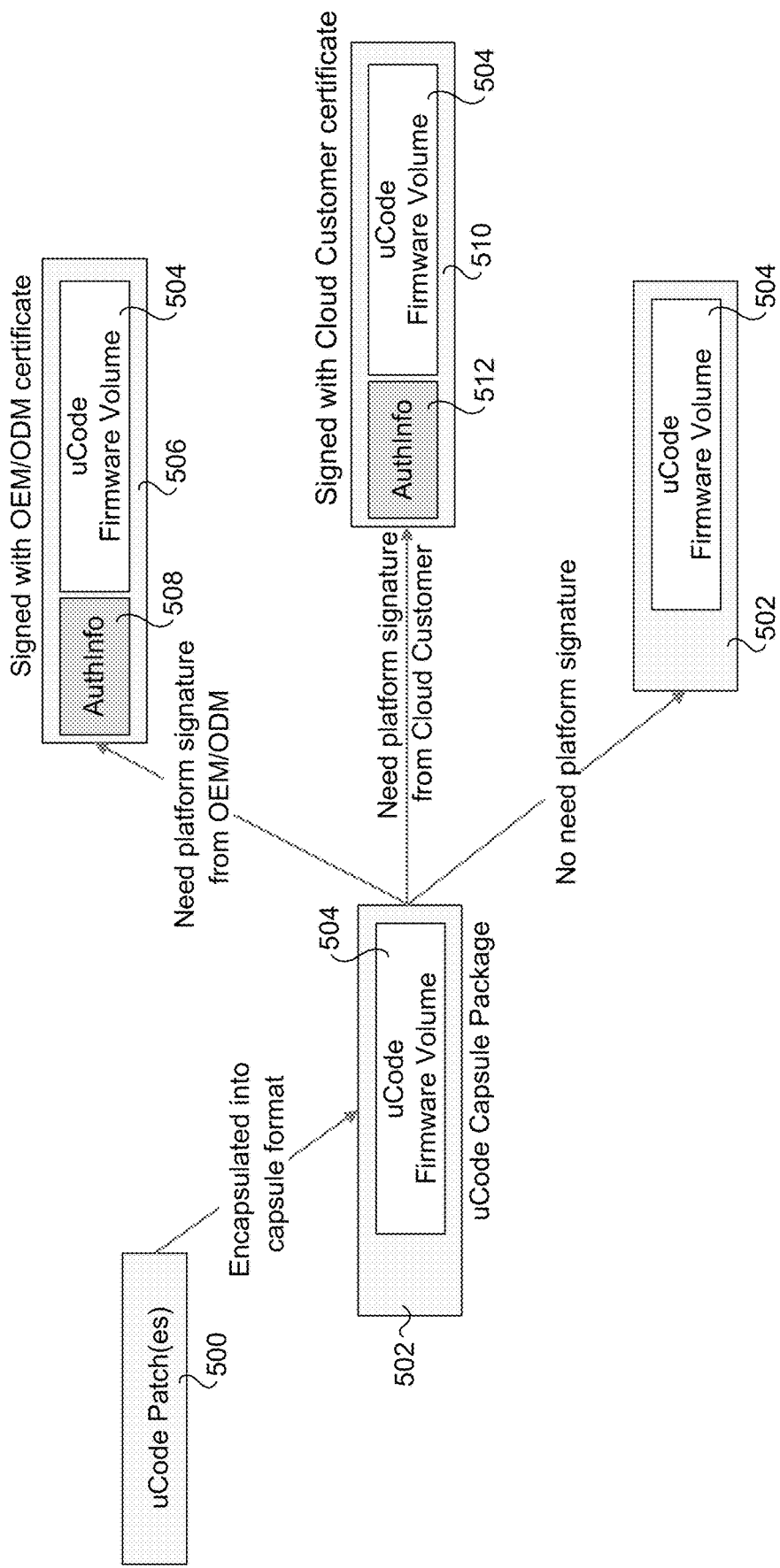
FIG. 5 is a diagram illustrating an embodiment of an encapsulation process that produces different uCode capsule package formats including formats with and without authentication information comprising signed certifications.

In some embodiments, the uCode patch is encapsulated into a capsule format and a capsule firmware update interface is used to update the uCode regions in BIOS flash. The capsule format uCode image can be built by either an offline phase or online phase to support flexible integrity check method. Examples of capsule formats and packaging schemes are shown in FIGS. 4 and 5. In one embodiment, the capsule formats comply with the capsule format defined by an applicable UEFI specification.

As illustrated in FIG. 4, a uCode capsule package 400 includes a UEFI capsule header 402, a firmware management protocol (FPM) field 404, an authentication information (AuthInfo) field 406, and a payload 408 containing a uCode firmware volume 410. In one embodiment, the uCode patch is encapsulated into standard capsule format (e.g., uCode capsule package 400) by some system utility to ensure the uCode capsule package for the same CPU SKU (stocking unit—i.e., the same CPU part) is compliant across different platform vendors' BIOS implementations.

An SMI (System Management Interrupt) hander is defined in BIOS to parse the uCode patch from the capsule image. Generally, the uCode capsule package 400 can be dynamically generated either by offline tools from the OEM/ODM/platform vendor or by online tools from the cloud customer configured to support flexible release and variable security check requirements. To support the integrity check for the update image, a signature may be added into AuthInfo field 406; this signature is created using platform credentials from either the OEM/ODM/platform vendor or from cloud customers. For such cases (employing signatures), in one embodiment the SMI handler is configured to check the integrity of the BIOS update image by validating this signature with an internal platform credential.

In some instances, a given uCode release will including multiple uCode patches that are configured to be implemented on the same CPU model while supporting different stepping levels. For example, stepping levels for a CPU may including A0, A1, A2, etc. In the cases where changes are more significant, the stepping levels may use a next letter, such as B0, then B1, B2, etc. The uCode patches for a CPU model for a given stepping level may differ from uCode patches for that CPU model for another stepping level, thus multiple uCode patches may be included in an update package.

Generally, an OEM/ODM (original equipment manufacturer or original device manufacturer) may create an uCode update package with multiple uCode patches to support multiple stepping levels for a CPU model or produce (e.g., blade server, server module, etc.) for which the uCode update package is targeted. For example, a platform vendor may manufacture and sell a given blade server for several years employing the same CPU model, while during that time the stepping versions of the CPU model will have changed. Thus, a uCode update for the blade server may require multiple patches.

In the case of a cloud operator, some uCode update packages may be more targeted to only be implemented on a CPU model with a specific stepping level. In this case, the uCode update package may only include a single uCode patch. In other cases, the cloud operator may generate uCode update packages with multiple uCode patches.

As shown in FIG. 5, the encapsulation process starts with one or more uCode patches 500 that are encapsulated into a uCode capsule format 502 including a uCode firmware volume 504. If a platform signature from an OEM or ODM is needed, a uCode capsule format 506 signed with an OEM/ODM certificate is generated, including an AuthInfo field 508 (containing the certificate) and uCode firmware volume 504. If a signature from a cloud customer is needed, a uCode capsule format 510 signed with a cloud customer certificate is generated, including an AuthInfo field 512 (containing the certificate) and uCode firmware volume 504. If no platform signature is needed, uCode capsule package 502 can be provided as is.

Use of Out-Of-Band Controller to Update uCode Extension Region(s) in Bios Flash in Runtime During platform boot time, the BIOS firmware discovers uCode FVs region layout and sends a corresponding layout manifest file to the BMC firmware through an out-of-band channel or interface such as IPMI (Intelligent Platform Management Interface). When the cloud service provider accesses the BMC to request uCode FV region update with targeted uCode patch, the BMC firmware parses the uCode FV region address from the layout manifest file and flashes (writes) the uCode patch into the corresponding address through a runtime flash access channel, such as through use of an Enhanced Serial Peripheral Interface Bus (eSPI) using the eSPI protocol.

Figure 6:
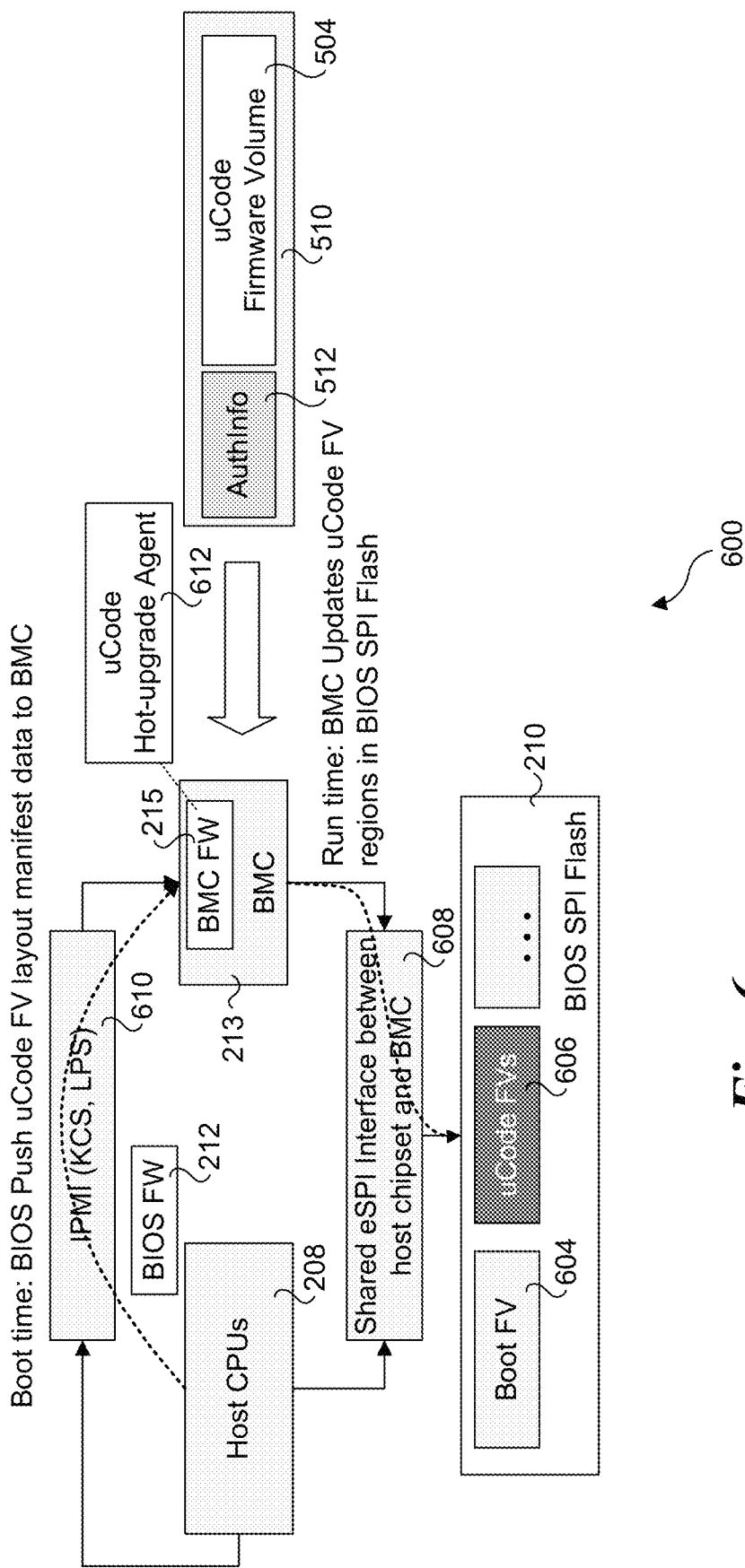
FIG. 6 is a schematic diagram illustrating an embodiment of a uCode hot-upgrade method used to update uCode FVs region using an out-of-band controller in runtime, according to one embodiment.

FIG. 6 shows a diagram 600 illustrating an embodiment of a uCode hot-upgrade method used to update uCode FVs region using an out-of-band controller in runtime. BIOS SPI flash 210 includes a boot FV 604 and uCode FVs 606. BIOS SPI flash 210 is connected to one or more of host CPUs 208 and BMC 213 via a shared eSPI interface between the host chipset and BMC 213, as depicted in a block 608. Host CPUs 208 are connected to BMC 213 using IPMI 610. BMC 213 is further shown as including a uCode hot-upgrade agent 612, which in one embodiment is implemented via execution of BMC firmware 215.

Prior to performing the uCode hot-upgrade, BMC agent 612 validates the integrity of the uCode update package with internal platform credentials. For example, as discussed above in shown in FIG. 5, uCode capsule format 510 is signed with a cloud customer certificate that includes an AuthInfo field 512. The certificate may be validated against credentials that are stored internally in the platform, such as in a secure module or the like (e.g., a trusted platform module (TPM)).

Figure 8:
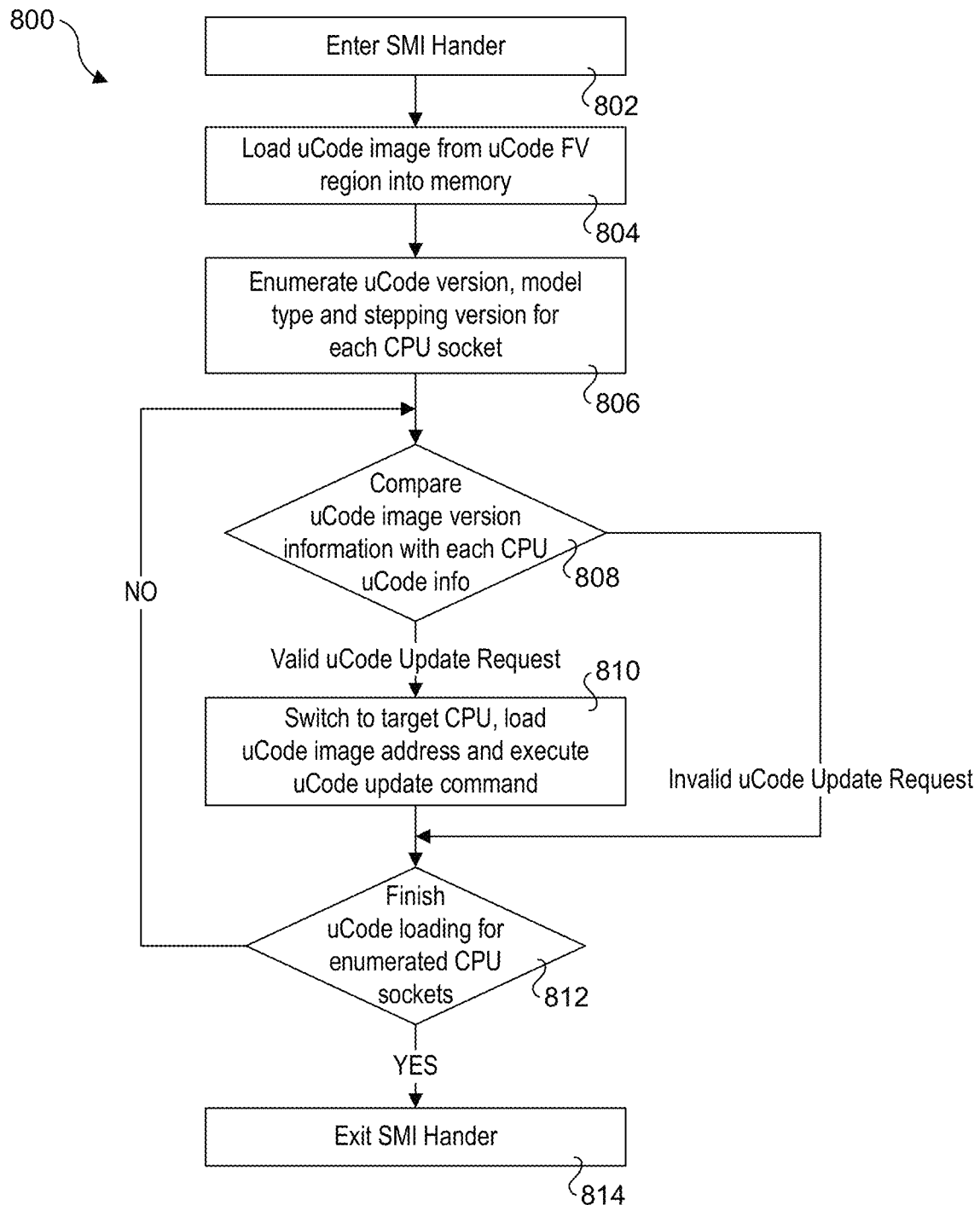
FIG. 8 is a flowchart illustrating operations and logic for an SMI service in BIOS firmware for implementing a uCode hot-upgrade procedure for one or more of CPUs, according to one embodiment.

An SMI service in BIOS firmware is defined to implement a uCode hot-upgrade procedure for one or more of CPUs 208, as shown in flowchart 800 of FIG. 8. An out-of-band channel is used for uCode hot-upgrade agent 612 to notify for BIOS 212 for entering the SMI service for uCode hot-upgrading. In one embodiment, the out-of-band notification channel includes a GPIO signal that supports SMI and the virtual wire message is sent over eSPI (e.g., block 608).

Figure 7:
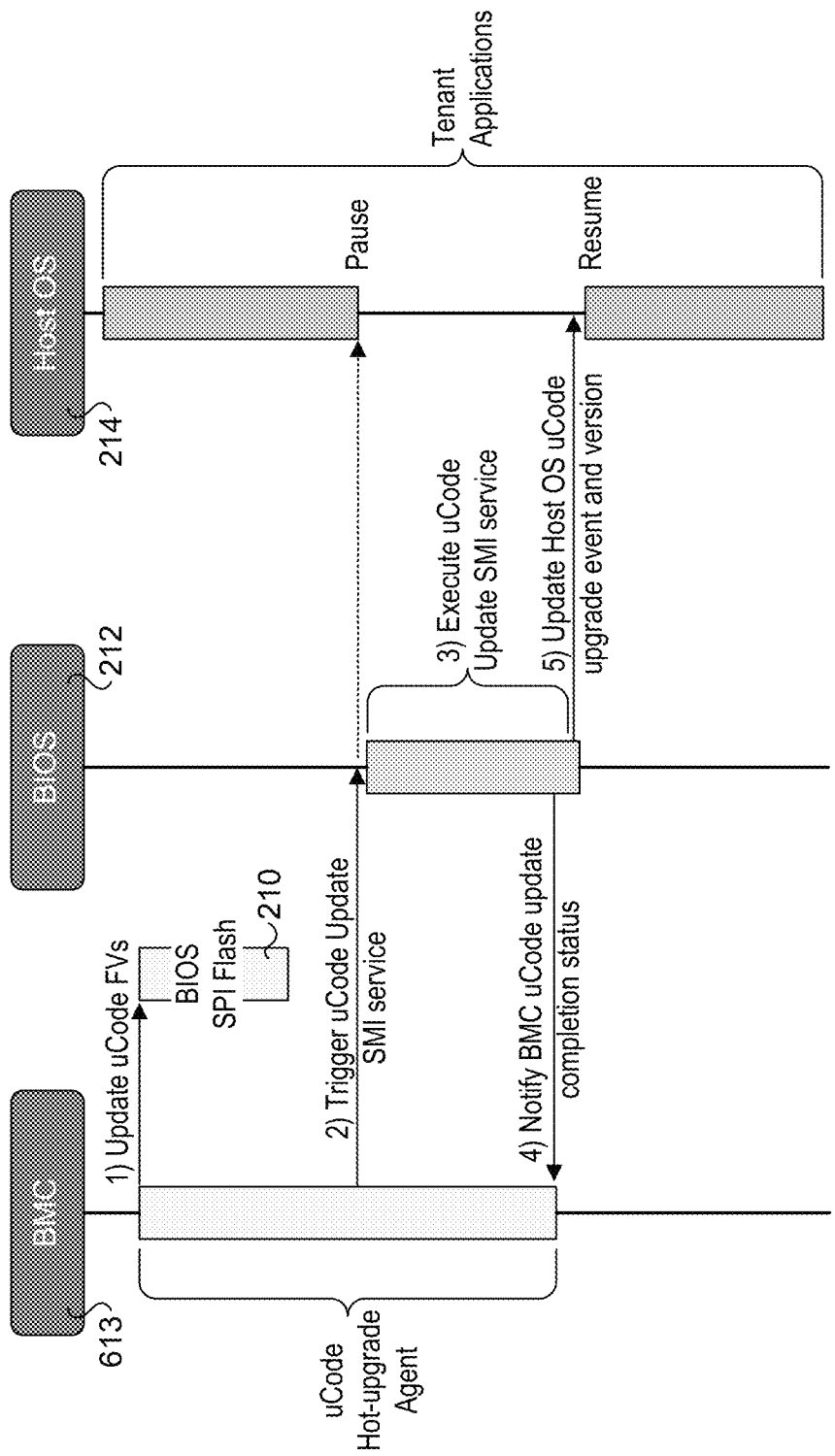
FIG. 7 is a flow diagram illustrating the message/signal flows and associated operations performed during the uCode hot-upgrade, according to one embodiment.

FIG. 7 shows a flow diagram 700 illustrating the uCode hot-upgrade message/signal flows and associated operations, according to one embodiment. During a first operation performed by uCode hot-update agent 612, the uCode FVs in BIOS SPI flash 210 are updated. Further details of this are presented below. When uCode hot-update agent 612 finishes update of the uCode FV region with the uCode patch image, it notified the BIOS firmware to execute the uCode hot-upgrade service using the out-of-band operations, as depicted by a second operation. As depicted by a third operation, when the host CPU received SMI asserting signal from BMC, it pauses the execution of host operating system and jumps into uCode hot-upgrade SMI service to load uCode to host CPUs 208 one by one. As depicted by a fourth operation, when the update is done, the uCode update SMI service responds to BMC 613 with an update completion status through the IPMI channel of the SMI service. BIOS 212 also notifies host operating system 214 of the uCode upgrade event and updated uCode version, as depicted by a fifth operation. The host OS then resumes operation with host CPUs 208 using the upgraded uCode.

FIG. 8 shows a flowchart 800 illustrating operations and logic performed by the SMI hander. The process begins in a block 802 in which the SMI handler is entered. SMI is part of a CPUs System Management Mode (SMM), which enables SMI code (via SMI handlers) to run by pausing execution of instructions executing in non-SMM modes. In a block 804, the uCode image is loaded from the uCode FV region into memory.

Next, the SMI service enumerates the one or more CPUs (in the platform) and compares whether the uCode patch loaded into memory is valid for each of the targeted CPU or not. In a block 806 the uCode version, model type and stepping version for each CPU socket is enumerated. For platforms employing a single CPU (a single socket platform), there is only one CPU socket to enumerate.

The operations of decision blocks 808 and 812 and a block 810 are then performed for each enumerated CPU socket. In decision block 808, the uCode image version information is compared for each CPU uCode information to determine if the uCode update request is valid. For example, a uCode image may be valid for one stepping version of a CPU, and not be valid for other stepping version of a CPU, and in some instances a multi-socket platform may include CPUs with different stepping versions. If the uCode patch is valid for the target CPU, then the SMI service is switched to the target CPU execution context, the uCode image address is loaded and the uCode update command is executed to update the uCode for the target CPU by writing the uCode image to internal memory on the CPU used for uCode, as depicted in block 810. For a multi-core processor that has separate uCode for each core, the uCode update command may be repeated for each core to update the uCode for that core. If the uCode update request is invalid, block 810 is skipped. As shown in a decision block 812 and the loop back to decision block 808, the operations of decision block 808 and block 810 are repeated until uCode loading for all the enumerated CPU sockets have been completed (or skipped, if applicable). Once completed, the answer to decision block 812 is YES and the logic proceeds to a block 814 in which the SMI handler exits. This returns CPU execution back to the non-SMM mode that was executing prior to entering SMM, resulting in the host operating system resuming operation.

Figure 8A:
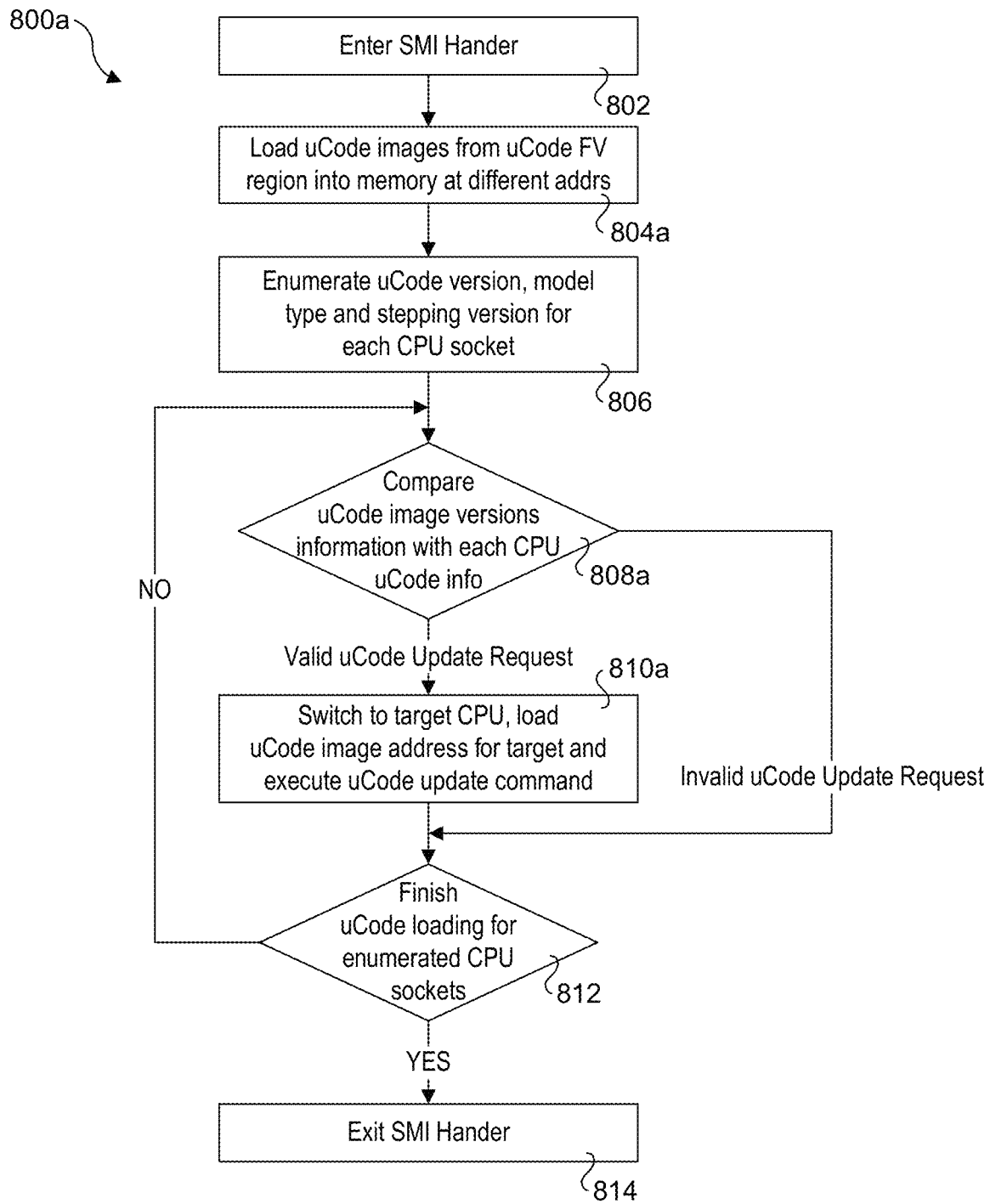
FIG. 8a is a flowchart illustrating an augmented version of the flowchart of FIG. 8 that further supports uCode patches with multiple uCode images corresponding to separate stepping versions of CPUs, according to one embodiment.

FIG. 8a shows a flowchart 800a according to a variant of flowchart 800 that supports uCode patches with multiple uCode images for respective stepping versions of a CPU. The operations in all the blocks are the same except for blocks 804a, 808a, and 810a. In block 804a, multiple uCode images (provided with the uCode patch) are loaded into memory at different starting addresses. In decision block 808a, the multiple uCode images are compared with the CPU uCode information for the CPU currently being processed, looking to match a uCode image having a stepping version that matches a stepping version of that CPU. If there is a match, the (starting) image address for that uCode image is loaded and the uCode update command is executed in block 810a to update the uCode for the target CPU.

Figure 8B:
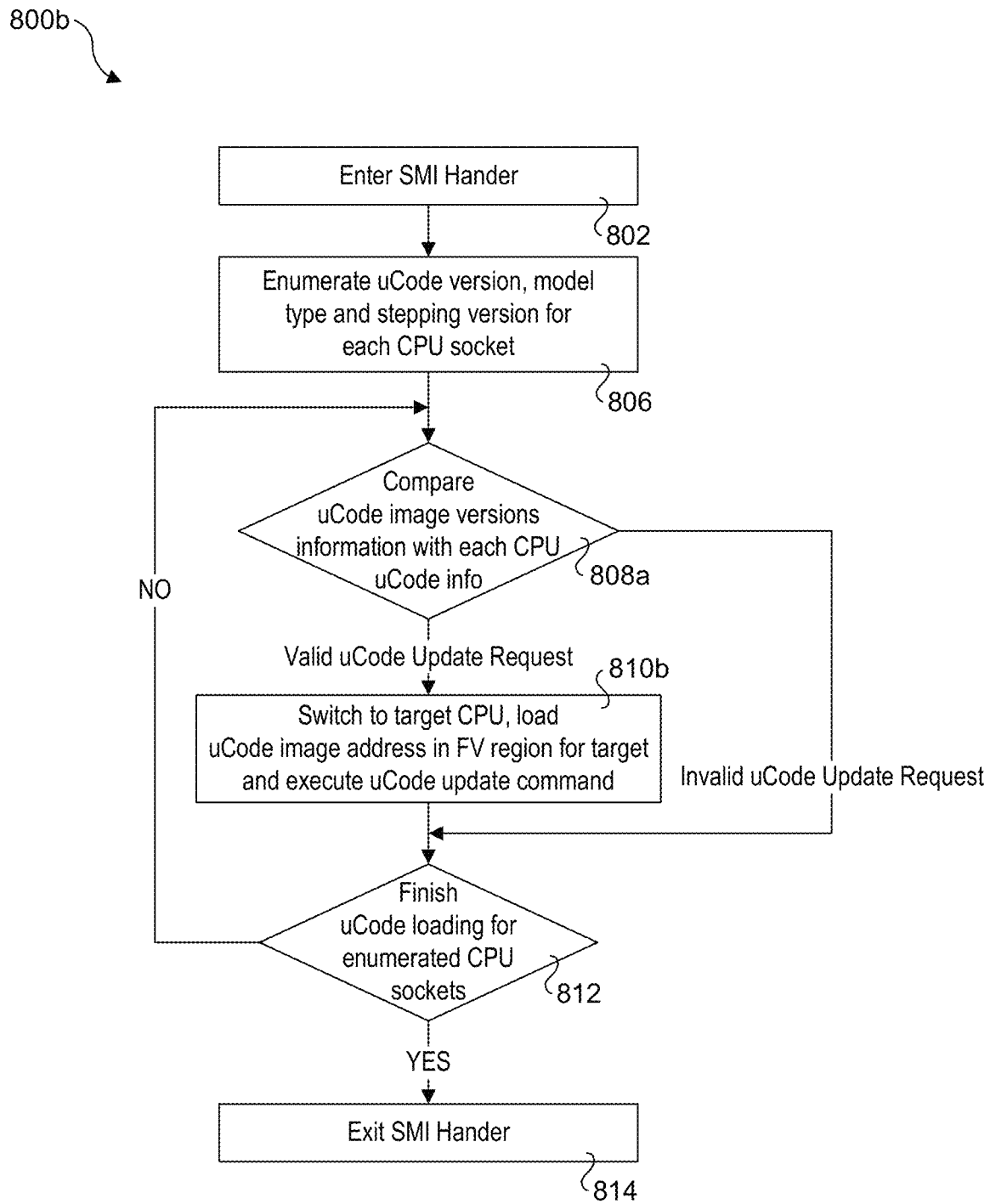
FIG. 8b is a flowchart 800b illustrating an alternative scheme under which firmware updates are loaded from the uCode FV region in the BIOS SPI flash rather than being loaded from memory, according to one embodiment.

FIG. 8b shows a flowchart 800b illustrating an alternative scheme under which firmware updates are loaded from the uCode FV region in the BIOS SPI flash rather than being loaded from memory. Thus, block 804 and 804a is skipped, and the uCode image address in the FV region is used in place of the uCode image address in memory, as shown in a block 810b. This scheme generally will have lower performance than the schemes in FIGS. 8 and 8a when the CPUs have a moderate or large number of cores, since the data transfer rate over SPI or eSPI is less than the data transfer rate when access data from system memory.

In one embodiment, a "ping-pong" scheme is used to alternatively update uCode extension FVs to support rollback to the most recent uCode patch in case some failures/exceptions crash the uCode extension FV being updated. The ping-pong scheme is used to alternatively update two uCode extension FVs, e.g., uCode Extension FV #1 and uCode Extension FV #2 in FIG. 3 and uCode images in uCode extension regions #1 and #2 in FIGS. 3a-3e presented below. If the uCode extension FV being updated is crashed due to some exceptions, such as an unexpected system shutdown or hang, the system is able to roll back to the most recent uCode patch from the alternative uCode extension FV. Under one embodiment, uCode base region 318 in Boot FV 302 is defined as one backup region to store the uCode base image; this region supports sync-up to latest bootable uCode image in a subsequent (next) boot.

Figure 9:
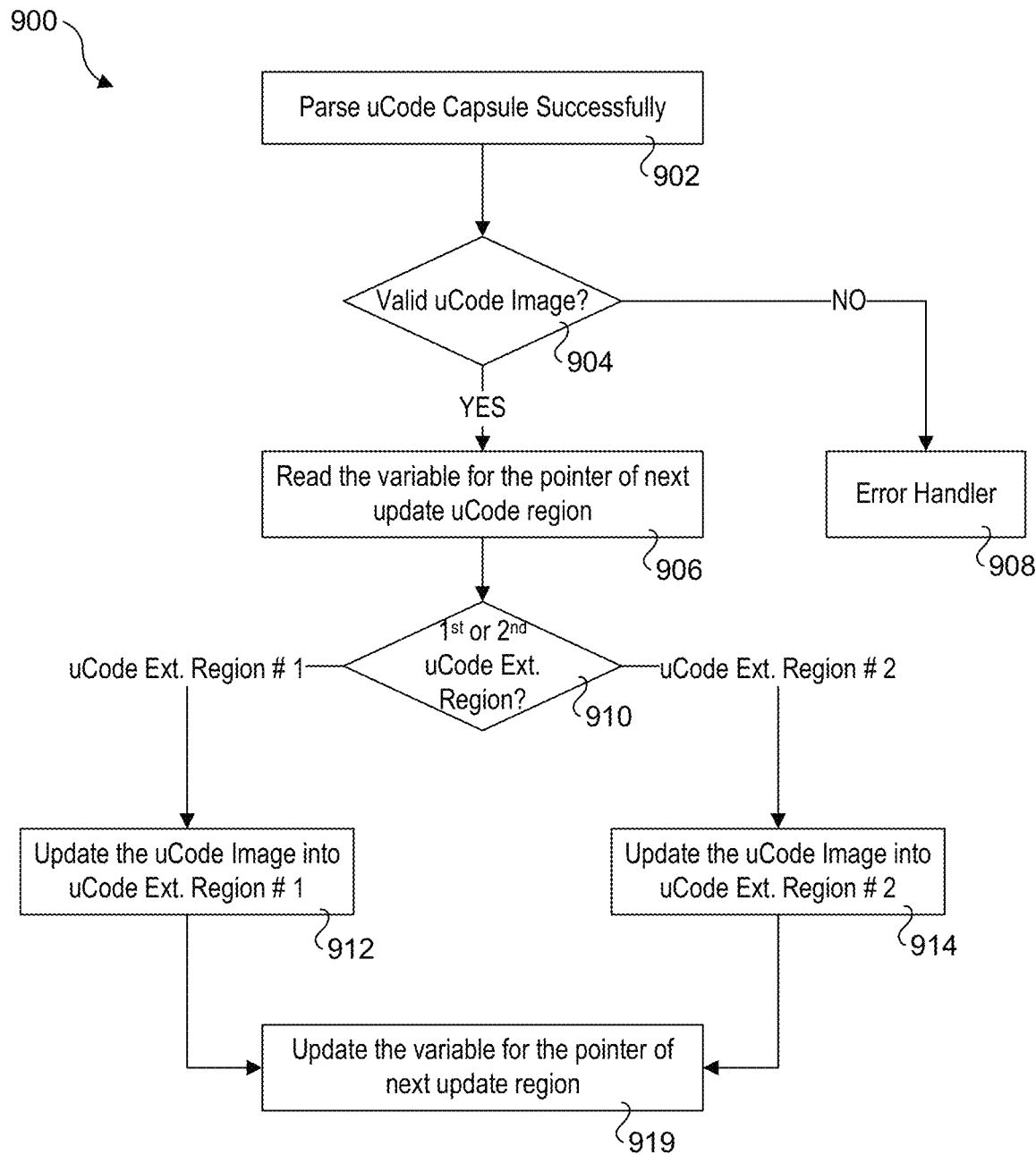
FIG. 9 is a flowchart illustrating logic and operations for implementing a ping-pong scheme under which uCode images are written to first and second uCode extension regions in an alternating manner, according to one embodiment.

FIG. 9 shows a flowchart 900 illustrating logic and operations for implementing the ping-pong scheme, according to one embodiment. The process begins in a block 902 in which the uCode capsule has been successfully parsed. In a decision block 904 a determination is made to whether the uCode image is valid. If the uCode image is determined to be invalid, the answer to decision block 904 is NO, and the logic proceeds to an error handler 908. If the uCode image is determined to be valid, the answer to decision block 904 is YES, resulting in the logic proceeding to a block 906 in which the variable for the pointer (e.g., the base address of uCode extension region #1 or #2) of the next update uCode region is read. In one embodiment this pointer value is stored in uCode patch entry 314.

In a decision block 910 a determination is made to whether uCode extension region #1 or uCode extension region #2 is to be used to store the uCode patch image. In one embodiment this determination is made based on the pointer value in uCode patch entry 314. If the pointer value in uCode patch entry 314 points to uCode extension region #1, the logic flows to the left-hand branch where the uCode image is written to uCode extension region #1, as depicted in a block 912. If the pointer value in uCode patch entry 314 points to uCode extension region #2, the logic flows to the right-hand branch where the uCode image is written to uCode extension region #2, as depicted in a block 914. For both branches, the logic then proceeds to a block 916 in which the variable for the pointer of the next update region is updated to reflect which uCode extension region will be used next (e.g., swapped to point to the uCode extension region that wasn't used).

Figure 3A:
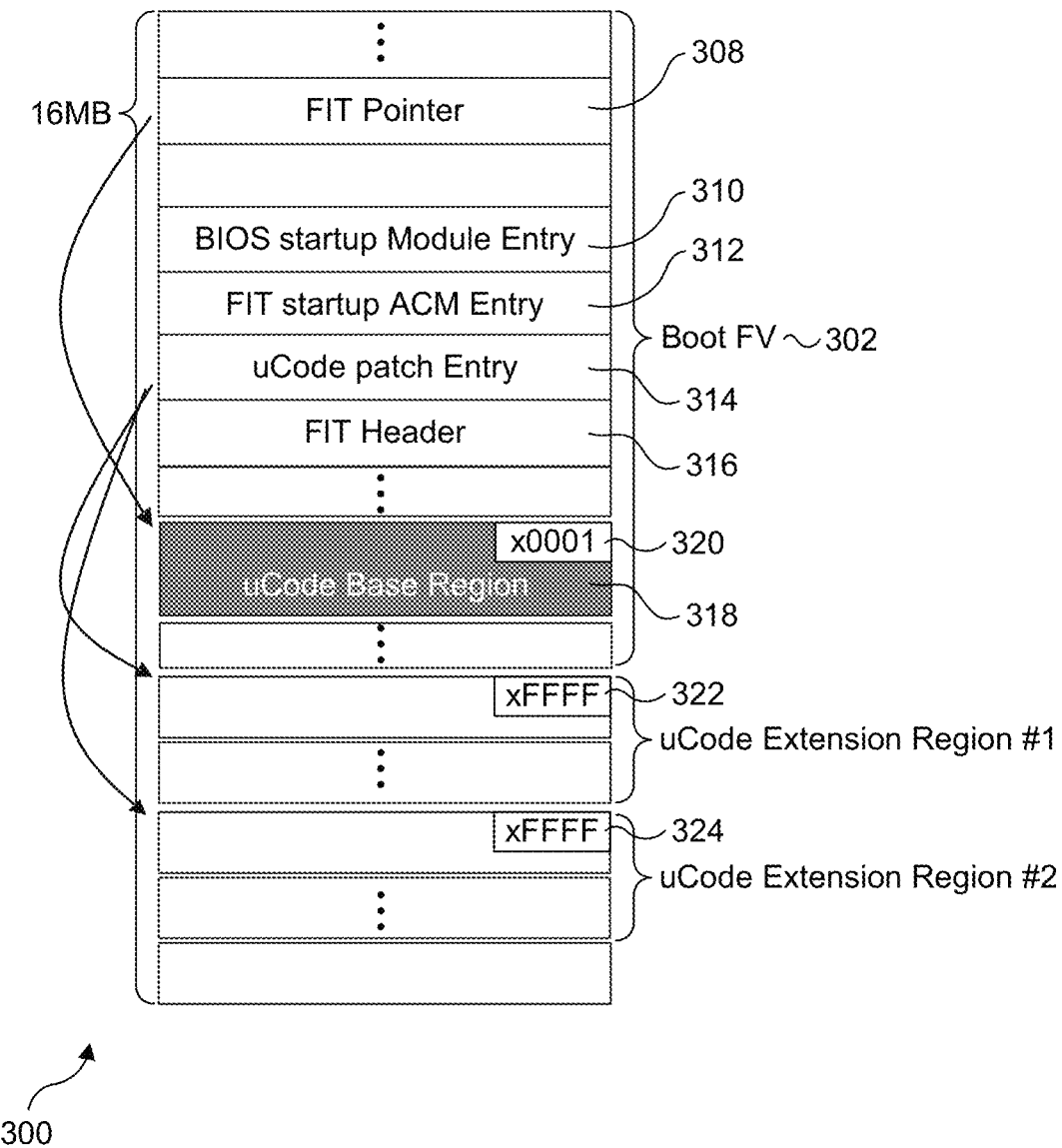

An initial configuration of the BIOS flash layout prior to receiving any uCode patches and corresponding to a first timeframe T1 is shown in FIG. 3a. In one embodiment, each firmware image will include a version number, such as depicted by a version number 320 for uCode base region 318. In this initial configuration, each of uCode extension region #1 and uCode extension region #2 are empty, except for headers 322 and 324 with values of xFFFF, which in one embodiment is used to indicate the firmware volume in the uCode extension region is invalid or corrupt. In one embodiment, uCode patch entry 314 will initially include pointers to both uCode extension region #1 and uCode extension region #2, and during boot both uCode extension region #1 and uCode extension region #2 will be inspected to see if they are storing a valid firmware volume.

Figure 3B:
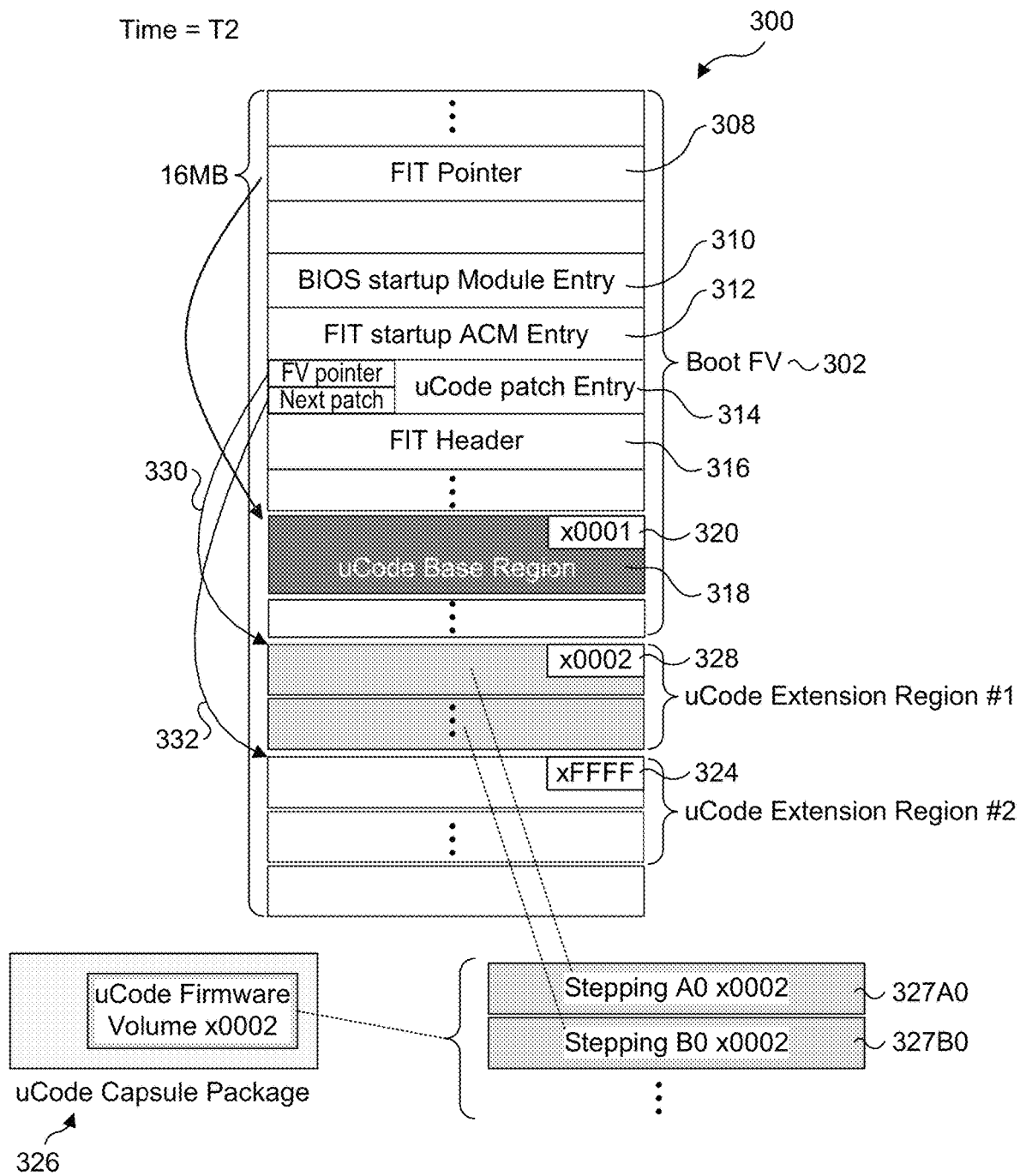

FIG. 3b illustrates a second timeframe T2 during which a uCode capsule package 326 comprising a first uCode update package has been received including a first set of uCode patches depicted as uCode patches 327A0 and 327B0. The uCode patches are written to uCode extension region #1 as a uCode image (also referred to as a firmware volume). As further shown, this uCode image has a version number of x0002 (included in a header 328), indicating it is a newer version than the current firmware volume (uCode image) stored in uCode base region 320. uCode patch entry 314 now is depicted as including a firmware volume pointer 330 that points to the starting address for uCode extension region #1 (and thus points to uCode FV version x0002), and a next patch pointer 332 that points to the starting address for uCode extension region #2, which will be used to store the next uCode patch.

Figure 3C:
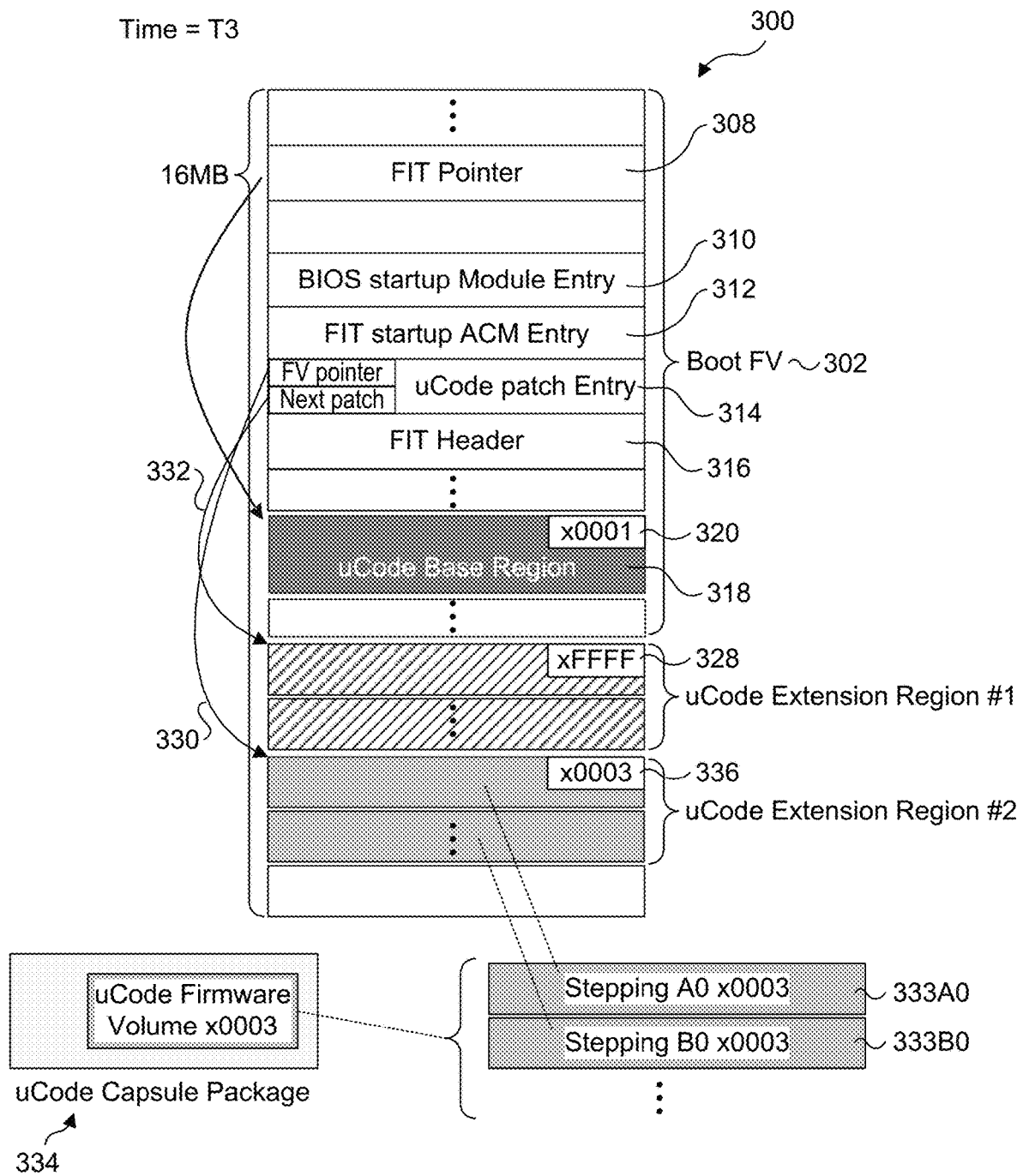

FIG. 3c illustrates a third timeframe T3 during which a second set of uCode patches (depicted as uCode patches 333A0 and 333B0) encapsulated in a uCode capsule package 334 has been received and has been successfully written to uCode extension region #2 as uCode firmware volume version x0003 (as indicated in a header 336). Version number x0003 is a newer FV version than both the current FV stored in uCode base region 320 and uCode FV version x0002. FV pointer 330 of uCode patch entry 314 now points to the starting address for uCode extension region #2 (and thus points to uCode FV version x0003), while next patch pointer 332 points to the starting address for uCode extension region #1, which will be used to store the next uCode image extracted from the next uCode update package.

Figure 10:
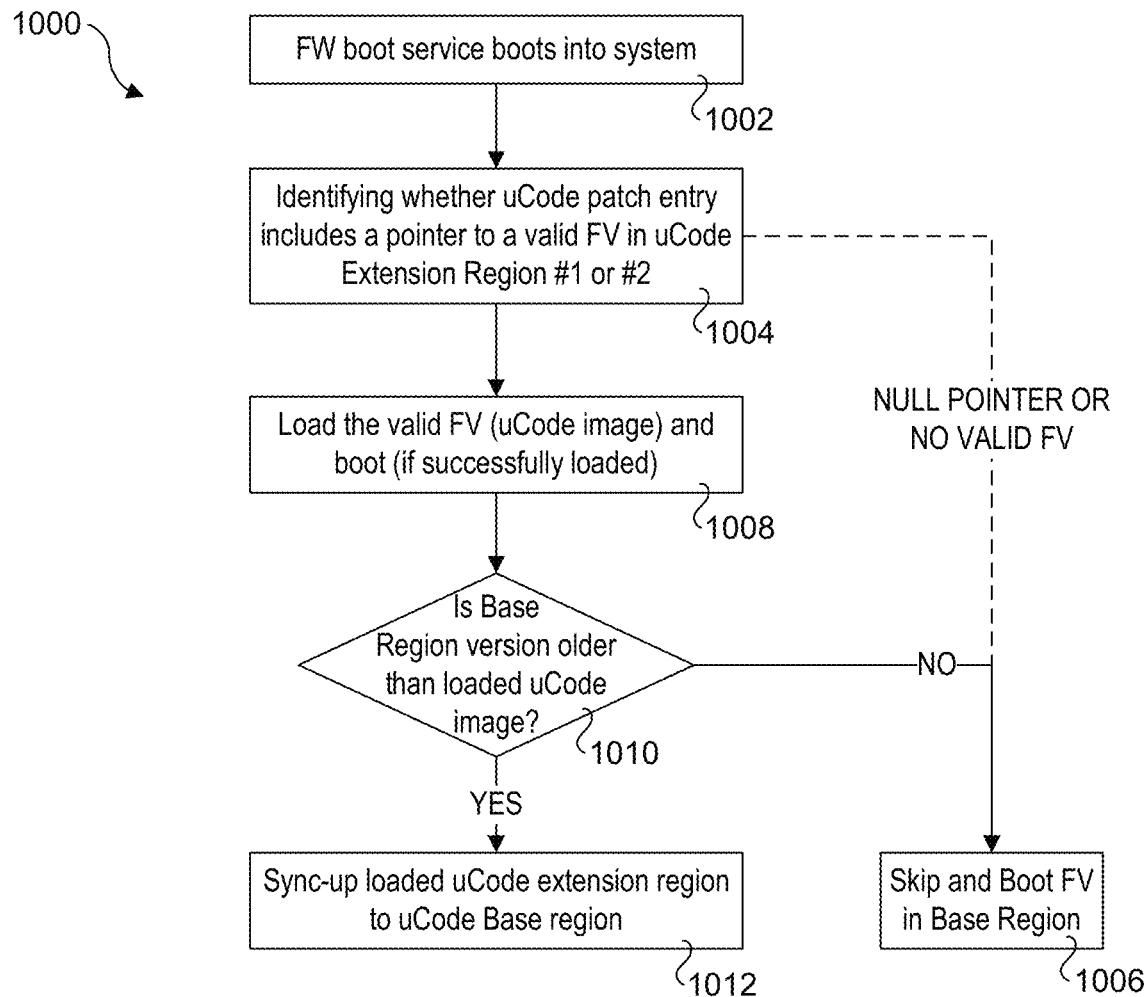
FIG. 10 is a flowchart illustrating logic and operations implemented by a firmware boot service to selective boot a most recent uCode image, according to one embodiment.

In accordance with another aspect of the uCode patch update scheme, during a next BIOS boot process, the latest firmware image (e.g., FV with the highest version number) is copied into the uCode base region as part of a base region sync-up processes. Operations and logic for implementing this process, according to one embodiment, are shown in a flowchart 1000 of FIG. 10.

The process begins in a block 1002 in which the firmware boot service boots into the system. In a block 1004 the firmware boot service identifies whether uCode patch entry 314 includes a pointer to a valid FV in uCode extension region #1 and #2. In one embodiment, uCode patch entry 314 employs permanent pointers to slots in each of uCode extension region #1 and #2, and thus both uCode extension regions are checked for a valid FV. In another embodiment, such as illustrated in FIGS. 3b and 3c, uCode patch entry 314 includes FV pointer 330 that points to a valid FV (which will be stored in either uCode extension region #1 or #2). If neither uCode extension region #1 nor #2 stores a valid FV, the logic proceeds to a block 1010 in which the FV in uCode base region 318 is booted.

If a valid FV is found in block 1004, that uCode image corresponding to the FV will be loaded and booted (if successfully loaded) in a block 1008. In a decision block 1010 a determination is made to whether the uCode image in uCode base region 318 is older than the loaded uCode image. If not, the answer is NO and the logic proceeds to block 1006 in which the loaded uCode image is skipped and the uCode image in uCode base region 318 is loaded and booted. If the loaded uCode image is newer than the uCode base region 318 image, the answer to decision block 1010 is YES, and the logic proceeds to a block 1012 in which the loaded image from uCode extension region #1 or #2 (as applicable) is synced-up to uCode base region 318 by copying the uCode image into uCode base region 318. This results in updating the uCode image in uCode base region 318 to the most recent version.

It is noted that during a sync-up process either a portion of the uCode in uCode base region 318 is updated/replaced, or all the uCode is updated/replaced, depending on the configuration and contents of the update package. For example, under a modular firmware architecture, such as UEFI, the firmware (BIOS uCode) comprises a combination of core UEFI components and extensions implemented as UEFI modules that are also referred to as images, such as UEFI driver images and UEFI application images. In some instances, a uCode patch may be targeted to a particular UEFI module, and thus only uCode for that particular UEFI module is updated/replaced during the sync-up process rather than updating/replacing the entirety of the uCode in the uCode base region.

Figure 3D:
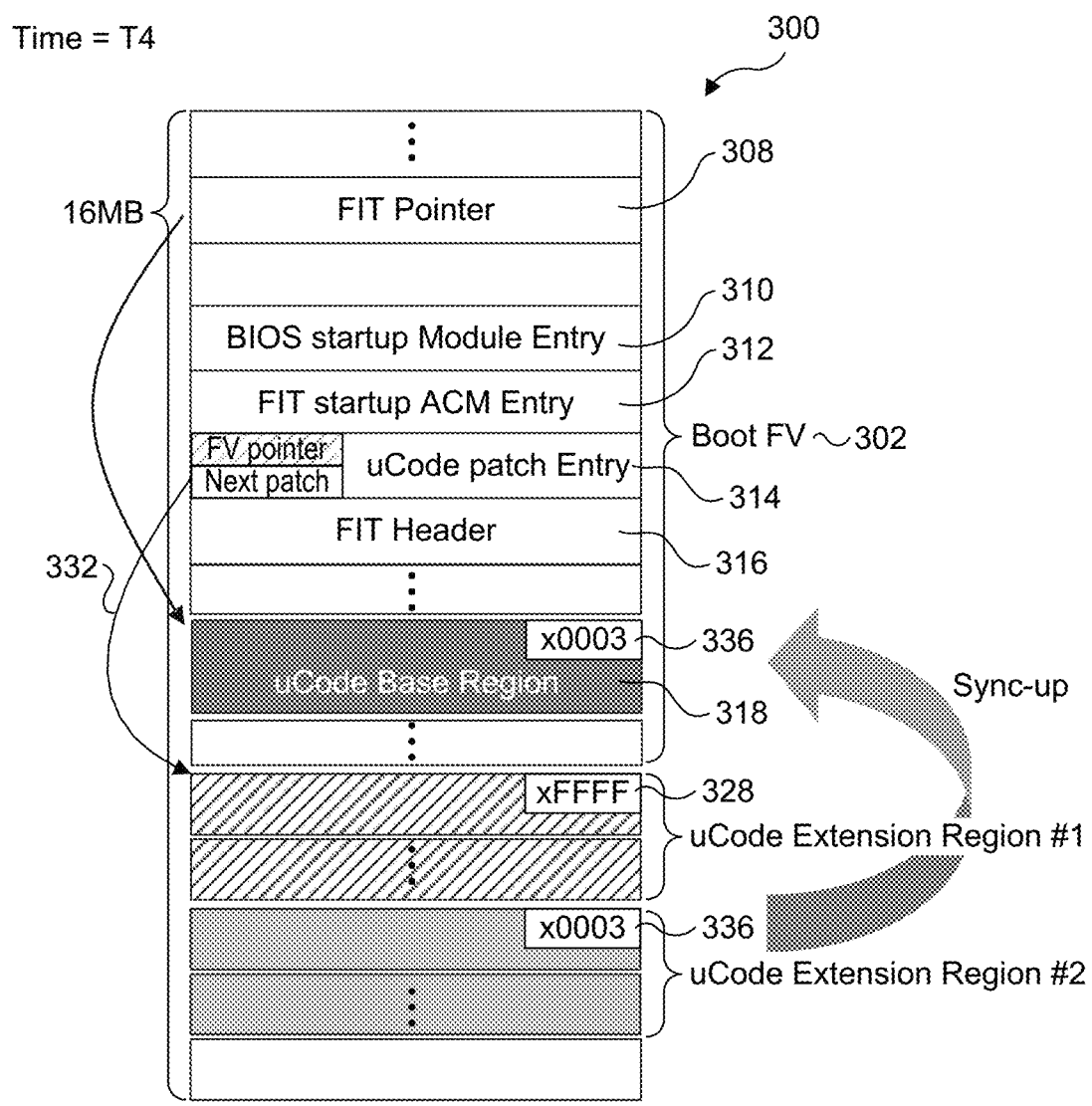

An example of this sync-up process is illustrated in FIG. 3d, which corresponds to a timeframe T4. In this instance, a uCode image with version x0003 is loaded from uCode extension region #2, and after confirmation that it has successfully booted, the uCode image is written to uCode base region 318. This results in the most recent uCode image being stored in uCode base region 318. As a result, in the illustrated embodiment FV pointer 332 is set to 0XFFFF (or some other predefined value) to indicate that there are no newer uCode images in either uCode extension region #1 or #2. As further shown, next patch pointer 332 still points to uCode extension region #1.

In some embodiments under which multiple stepping version uCode patches are included in an update package, the SMI BIOS code may be configured to filter for only those uCode patches that have a stepping version that matches the stepping version of the processor. Under this approach, providers of uCode update packages can build and send out update package with multiple stepping versions without having to know the particular stepping version that is implemented by each processor for which uCode is to be updated.

Figure 3E:
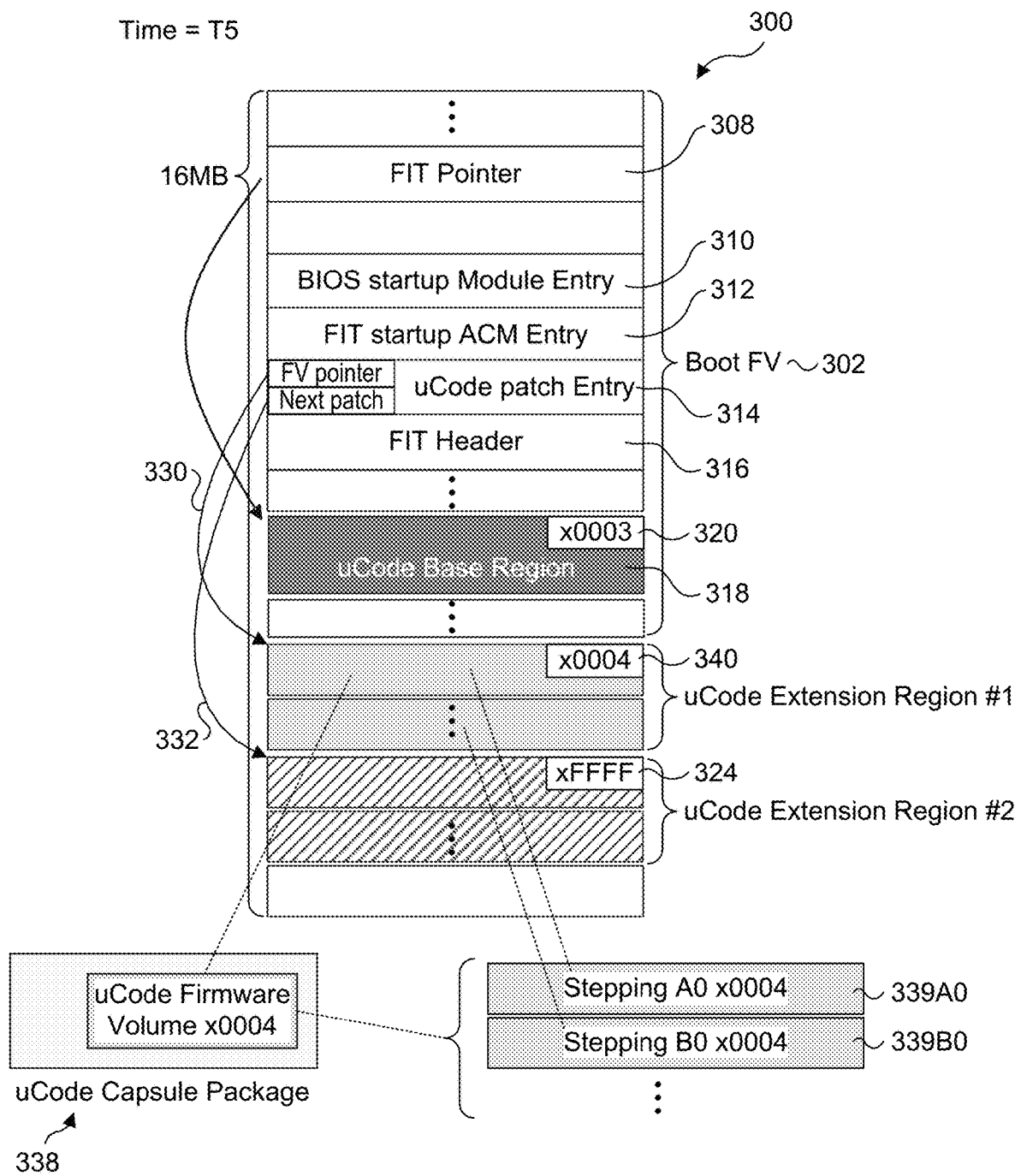

The state of the BIOS flash layout after a fifth timeframe T5 is shown in FIG. 3e. During this timeframe, a third uCode capsule package 338 is received that includes a uCode FV having a version x0004 and including uCode patches 339A0 and 339B0. This uCode image is written to uCode extension region #1, which corresponded with the uCode extension region pointed to by next patch pointer 332 following timeframe T4 in FIG. 3*d*. Following the ping-pong scheme, the value for next patch pointer 332 is swapped to now point to uCode extension region #2, which will be the uCode extension region to be used for the next uCode patch.

Figure 3F:
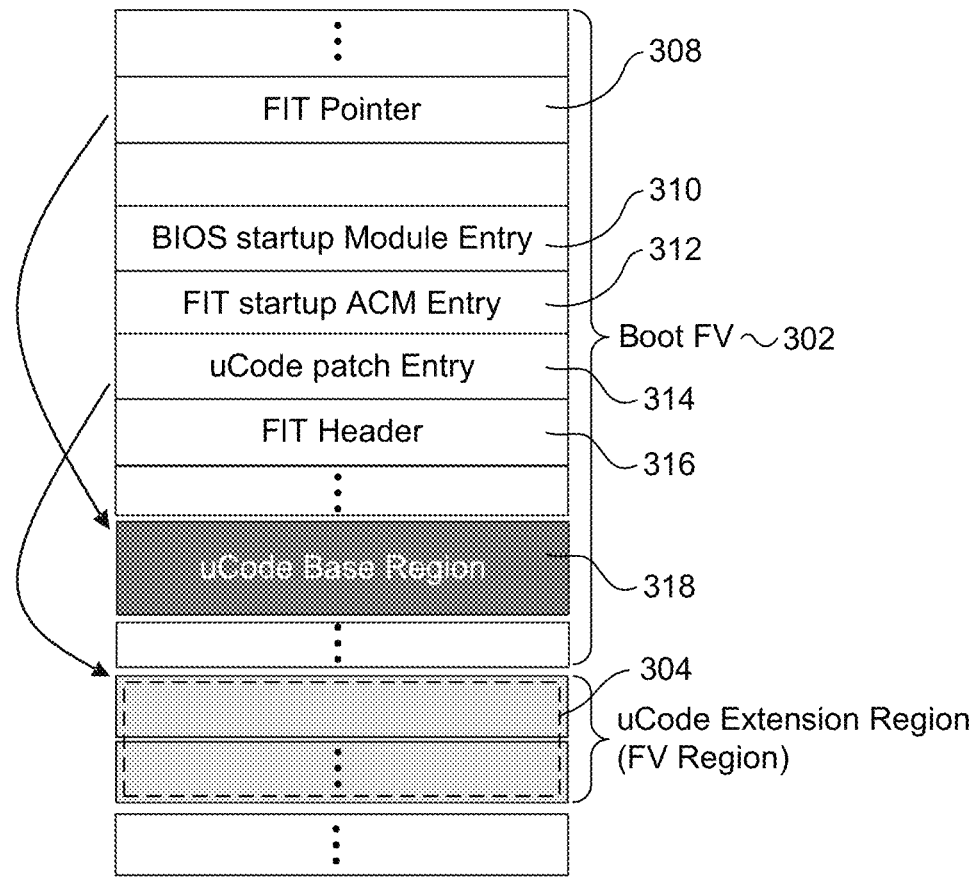
FIG. 3f is a diagram illustrating the structure of a BIOS flash layout including a single uCode extension region, according to one embodiment.

A diagram 300*f* illustrating an embodiment of the BIOS SPI flash layout employing a single extension region is shown in FIG. 3*f*. Under embodiments employing a single extension region the foregoing ping-pong scheme is not employed, but persistence is still supported. In this case, the uCode patch is written to the uCode extension regions as an FV, and subsequently the uCode in uCode Base Region 318 is synced with the updated uCode in the FV.

Figure 11:
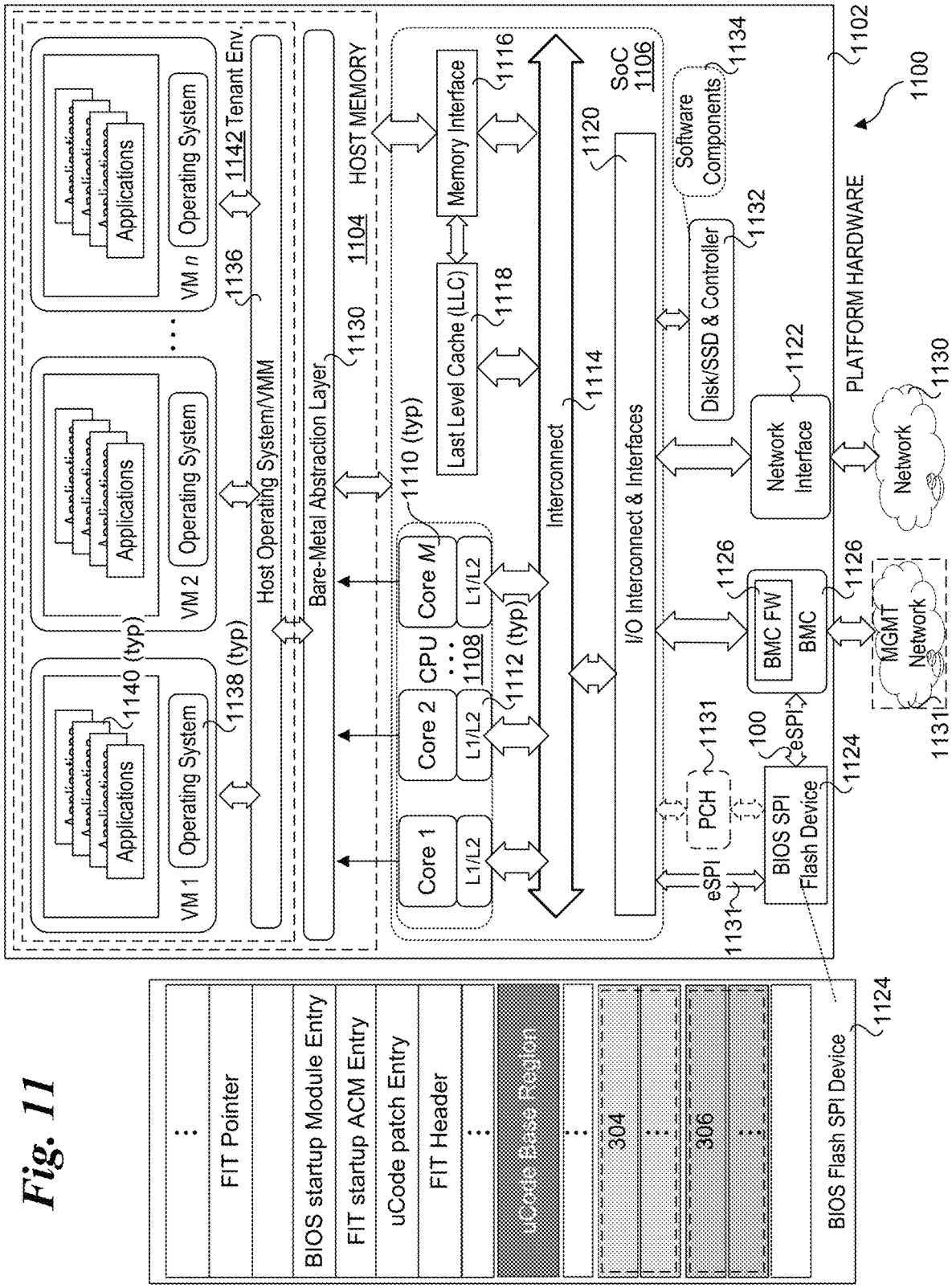
FIG. 11 is a schematic diagram of an exemplary bare metal platform architecture on which embodiments disclosed herein may be implemented.

FIG. 11 shows an embodiment of a bare metal cloud platform architecture 1100 corresponding to a bare metal platform suitable for implementing aspects of the embodiments described herein. Architecture 1100 includes a hardware layer in the lower portion of the diagram including platform hardware 1102, and a software layer that includes software components running in host memory 1104. Architecture 1100 implements the modular microcode (uCode) patch method to support runtime persistent update, as illustrated by the BIOS flash layout depicted for BIOS flash device 1124 corresponding to the BIOS flash layout of diagram 300 in FIG. 3.

Platform hardware 1102 includes a processor 1106 having a System on a Chip (SoC) architecture including a central processing unit (CPU) 1108 with M processor cores 1110, each coupled to a Level 1 and Level 2 (L1/L2) cache 1112. Each of the processor cores and L1/L2 caches are connected to an interconnect 1114 to which each of a memory interface 1116 and a Last Level Cache (LLC) 1118 is coupled, forming a coherent memory domain. Memory interface is used to access host memory 1104 in which various software components are loaded and run via execution of associated software instructions on processor cores 1110.

Processor 1106 further includes an Input/Output (I/O) interconnect hierarchy, which includes one or more levels of interconnect circuitry and interfaces that are collectively depicted as I/O interconnect & interfaces 1120 for simplicity. Various components and peripheral devices are coupled to processor 1106 via respective interfaces (not all separately shown), including a network interface 1122, a BIOS SPI flash device 1124, and a BMC 1125 including BMC firmware 1126. As shown on the left side of FIG. 11, BIOS SPI flash device 1124 has a BIOS flash layout illustrated in diagram 300 and stores firmware and BIOS uCode in the manner discussed above. Generally, the interfaces illustrated in FIG. 6 may be used to support communication between processor 1106, BIOS SPI flash device 1124, and BMC 1125, as depicted by eSPI links 1127 and 1128. As an option, BIOS SPI flash device 1124 may be operatively coupled to processor 1106 via a platform controller hub (PCH) 1129. BMC 1125 may also be operatively coupled to processor 1106 via PCH 1129 (connection path not separately shown. Network interface 1122 is connected to a network 1130. In some embodiments, BMC 1126 is connected to a management network 1131 that is separate from network 1130. In other embodiments, BMC 1126 either is connected to network 1130 using a built-in or separate network interface (both not shown) or BMC 1126 is configured to communicate with external entities coupled to network 1130 via network interface 1122.

Platform hardware 1102 also includes a disk drive or solid-state disk (SSD) with controller 1132 in which software components 1134 are stored. Optionally, all or a portion of the software components used to implement the software aspects of embodiments herein may be loaded over a network 1130 accessed by network interface 1122.

During platform initialization, a current or new uCode image and various UEFI modules (not separately shown) are loaded into host memory 1104 and booted, followed loading and initialization of various software components. The software components include a host operating system and a VMM 1136 (that would sit above the host operating system but is not shown separately) used to host n virtual machines (VMs) VM 1, VM 2 . . . VM n, each including an operating system 1138 on which one or more applications 1140 are run. Platform architectures employing containers, such as Docker®-type containers, may be implemented in a similar manner. In addition, non-virtualized computing platforms that only run a single instance of an operating system (e.g., applications run directly on host operating system 1136) may also be used.

As further illustrated in FIG. 11, the software components in host memory 1104 that include host operating system/VMM 1136 and above are part of tenant environment 1142. Meanwhile, software components depicted as a bare metal abstraction layer 1144 are part of the cloud service provide environment. Generally, the cloud service provider environment will provide mechanisms to support separate access to tenant environment 1142 and portions of host memory 1104 that are used by the cloud service provider. In some embodiments, the bare metal cloud platform hardware and bare metal abstraction layer are part of a trusted computing base (TCB).

For multi-socket bare metal cloud platforms, the platform architecture would be somewhat similar to that shown in FIG. 11, but with multiple processors (CPUs), each in its own socket, and socket-to-socket interconnects connecting the sockets. Each CPU/socket would also be provided with applicable interfaces to communicate with BIOS SPI Flash device 1124 and BMC 1125, as well as other IO components.

As used herein, "runtime" and "operating system runtime" refer to an operational phase of a platform following booting of a host operating system. Accordingly, when the host operating system is paused during an out-of-band hot-upgrade process, the host operating system is still in runtime through the process. Moreover, when the host operating system is paused it is unaware of any operations being performed by the CPUs on the bare metal platform and the out-of-band hot-upgrade process provided by the embodiments herein are transparent to the host operating system.

As used herein, "out-of-band" means a communication channel that does not employ communication facilities provided by an operating system, such as a network software stack. As a result, out-of-band communications are implemented separate and apart from communications in the tenant environment involving the host operating system.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications. Thus, embodiments of this invention may be used as or to support a software program, software modules, and/or firmware (BIOS), executed upon some form of processor, processing core or embedded logic, a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
during runtime operation of a host operating system in a tenant environment hosted on a bare metal platform including one or more host central processing units (CPUs) on which the host operating system and applications in the tenant environment are executed, at least one of the one or more host CPUs coupled to a firmware storage device in which firmware including microcode (uCode) is stored and wherein the firmware storage device has a layout partitioned into a plurality of regions, including one or more uCode firmware volume (FV) regions,
providing a uCode patch to an out-of-band controller communicatively coupled to the firmware storage device;
writing, using the out-of-band controller, the uCode patch to a uCode FV region; and
employing an out-of-band uCode hot-upgrade process to update firmware uCode for at least one of the one or more host CPUs by updating the uCode for that CPU with uCode from the uCode FV region.

2. The method of claim 1, wherein the uCode hot-upgrade process is transparent to the host operating system in the tenant environment.

3. The method of claim 1 further comprising:
triggering, using an interrupt, a uCode update service to execute on a host CPU;
pausing execution of the host operating system;
executing the uCode update service to, load a uCode image from the uCode FV region into memory on the bare metal platform;
for each of at least one host CPU,
load a uCode image address at which a uCode image for a host CPU is loaded in the memory and execute a uCode update command to update the uCode for that host CPU; and
resuming execution of the host operating system following completion of the uCode update service.

4. The method of claim 3, wherein the bare metal platform includes a plurality of host CPUs, wherein the uCode patch includes multiple uCode images corresponding to respective stepping versions, and wherein execution of the uCode update service causes the bare metal platform to:
enumerate a uCode version, model type and stepping version for each of the plurality of host CPUs;
for each host CPU that is enumerated, one at a time,
compare uCode image version information with CPU uCode information for a host CPU;
determine whether a uCode update for that host CPU is valid; and,
when the uCode update for that host CPU is valid,
switch execution to target that host CPU; and
load a uCode image address at which a uCode image having the stepping version for that host CPU is loaded in the memory and execute a uCode update command to update uCode for that host CPU.

5. The method of claim 3, wherein the interrupt comprises a System Management Interrupt (SMI) and the uCode update service comprises a uCode update SMI service, and wherein the SMI and execution of the uCode update SMI service causes the host CPU to:
switch the host CPU from a current operational mode to a System Management Mode (SMM),
wherein execution of the host operating system is paused while the host CPU is in SMM;
execute the uCode update SMI service while the host CPU is in SMM;
return the host CPU to the current operational mode; and
resume execution of the host operating system.

6. The method of claim 1, wherein the firmware storage device is a Basic Input-Output System (BIOS) Serial Peripheral Interface (SPI) flash memory device, and wherein the out-of-band controller is a baseboard management controller (BMC) coupled to the BIOS SPI flash memory device via an enhanced Serial Peripheral Interface Bus (eSPI) or Serial Peripheral Interface Bus (SPI).

7. The method of claim 6, further comprising:
discovering a layout of uCode FV regions for the BIOS SPI flash memory device; and
sending uCode FV region layout information corresponding to the layout of the uCode FV regions that are discovered to the BMC.

8. The method of claim 1, wherein the plurality of regions includes a uCode base region and one or more uCode FV extension regions, further comprising:
booting a host CPU using a current uCode image having a first version in the uCode base region;
writing the uCode patch as a second uCode image having a second version to a uCode FV extension region; and
copying the second uCode image into the uCode base region to sync-up a current uCode image in the uCode base region.

9. A bare metal platform, comprising:
one or more host central processing units (CPUs);
a memory, coupled to the one or more CPUs;
a firmware storage device in which firmware including microcode (uCode) are stored, communicatively coupled to at least one of the one or more CPUs, wherein the firmware storage device has a layout partitioned into a plurality of regions, including one or more uCode firmware volume (FV) regions; and
an out-of-band controller, communicatively coupled to at least one host CPU and communicatively coupled to the firmware storage device,
wherein the bare metal platform is configured to be implemented in a cloud service provider environment and host a tenant environment in which a host operating system and applications are executed on the one or more CPUs, and wherein the bare metal platform is configured to,
implement a uCode hot-upgrade process using the out-of-band controller to update uCode for at least one of the one or more CPUs during runtime operation of the host operating system using a uCode patch;
write, using the out-of-band controller, the uCode patch to a uCode FV region; and
for at least one of the one or more CPUs, update the uCode for that CPU with uCode from the uCode FV region.

10. The bare metal platform of claim 9, wherein the uCode hot-upgrade process is transparent to the host operating system in the tenant environment.

11. The bare metal platform of claim 9, further configured to:
trigger, using an interrupt, a uCode update service to execute on a host CPU;
pause execution of the host operating system;
execute the uCode update service to,
load a uCode image from the uCode FV region into memory on the bare metal platform;
for each of at least one host CPU,
load a uCode image address at which a uCode image for a host CPU is loaded in the memory and execute a uCode update command to update the uCode for that host CPU; and
resume execution of the host operating system following completion of the uCode update service.

12. The bare metal platform of claim 9, wherein the firmware storage device is a Basic Input-Output (BIOS) Serial Peripheral Interface (SPI) flash memory device, and wherein the out-of-band controller is a baseboard management controller (BMC) coupled to the BIOS SPI flash memory device via an enhanced Serial Peripheral Interface Bus (eSPI) or an SPI bus.

13. The bare metal platform of claim 12, further configured to:
discover a layout of uCode FV regions for the BIOS SPI flash memory device; and
send uCode FV region layout information corresponding to the layout of the uCode FV regions that are discovered to the BMC.

14. The bare metal platform of claim 9, wherein the plurality of regions includes a uCode base region and one or more uCode FV extension regions, and wherein the bare metal platform is further configured to:
boot a host CPU using a current uCode image having a first version in the uCode base region;
write the uCode patch as a second uCode image having a second version to a uCode FV extension region; and copy the second uCode image into the uCode base region to sync-up a current uCode image in the uCode base region.

15. An out-of-band controller configured to be implemented on a bare metal platform on which a host operating system and applications in a tenant environment are executed, the bare metal platform provided by a cloud service provider and including one or more host central processing units (CPUs) coupled to a firmware storage device in which firmware including microcode (uCode) are stored, wherein the firmware storage device has a layout partitioned into a plurality of regions, including one or more uCode firmware volume (FV) regions, the out-of-band controller communicatively coupled to the firmware storage device and communicatively coupled to at least one host CPU, wherein the out-of-band controller is configured to:

during runtime operation of the host operating system,
receive uCode FV region layout information corresponding to the layout of the one or more uCode FV regions; and write one or more uCode images in a uCode patch to a uCode FV region in the firmware storage device.

16. The out-of-band controller of claim 15, wherein the plurality of regions include multiple FV regions, and wherein the out-of-band controller is configured to;

write uCode in a first uCode patch to a first uCode FV region; and write uCode in a second uCode patch to a second uCode FV region.

17. The out-of-band controller of claim 15, wherein the out-of-band controller is a baseboard management controller (BMC) that includes BMC firmware that is executed on the BMC to effect the operations performed by the BMC.

* * * * *